(12) United States Patent
Jansen et al.

(10) Patent No.: US 8,273,264 B2
(45) Date of Patent: Sep. 25, 2012

(54) LIQUID-CRYSTAL COMPOUNDS AND LC MEDIA

(75) Inventors: Axel Jansen, Darmstadt (DE); Detlef Pauluth, Ober-Ramstadt (DE); Bernd Fiebranz, Muenster (DE); Bernhard Rieger, Muenster (DE)

(73) Assignee: Merck Patent Gesellschaft Mit Beschrankter Haftung, Darmstadt (DE)

( * ) Notice: Subject to any disclaimer, the term of this patent is extended or adjusted under 35 U.S.C. 154(b) by 0 days.

(21) Appl. No.: 12/687,973

(22) Filed: Jan. 15, 2010

(65) Prior Publication Data

US 2010/0181533 A1     Jul. 22, 2010

(30) Foreign Application Priority Data

Jan. 20, 2009 (DE) .......................... 10 2009 005 191

(51) Int. Cl.
     *C02F 19/00*      (2006.01)
     *C02F 19/02*      (2006.01)
     *C02F 19/06*      (2006.01)
     *C02F 19/52*      (2006.01)

(52) U.S. Cl. ......... 252/299.63; 252/299.01; 252/299.61; 252/299.62; 252/299.6; 252/299.64; 252/299.65; 252/299.66; 252/299.67; 428/1.1; 349/167; 349/182

(58) Field of Classification Search ............. 252/299.01, 252/299.6–299.67; 428/1.1; 430/20; 349/167, 349/182

See application file for complete search history.

(56) References Cited

U.S. PATENT DOCUMENTS

| | | |
|---|---|---|
| 4,528,114 A | 7/1985 | Petrzilka |
| 5,188,759 A | 2/1993 | Bartmann et al. |
| 5,264,149 A | 11/1993 | Buchecker et al. |
| 5,277,071 A | 1/1994 | Pieper |
| 5,328,637 A | 7/1994 | Buchecker et al. |
| 5,820,785 A * | 10/1998 | Schlosser et al. ........ 252/299.63 |

FOREIGN PATENT DOCUMENTS

| | | |
|---|---|---|
| DE | 3246440 A1 | 6/1983 |
| DE | 4027458 A1 | 8/1991 |
| DE | 4417441 A1 | 11/1995 |
| EP | 0501268 A2 | 9/1992 |
| EP | 0501268 A3 | 1/1993 |
| EP | 5051286 B1 | 1/1994 |
| EP | 0816332 A1 | 6/1997 |

* cited by examiner

*Primary Examiner* — Geraldina Visconti
(74) *Attorney, Agent, or Firm* — Millen, White, Zelano & Branigan, P.C.

(57) ABSTRACT

Disclosed are novel liquid-crystal compounds, processes and intermediates for the preparation thereof, the use thereof for optical, electro-optical and electronic purposes, in particular in liquid-crystal (LC) media and LC displays, and to LC media and LC displays containing the same.

21 Claims, No Drawings

LIQUID-CRYSTAL COMPOUNDS AND LC MEDIA

The present invention relates to novel liquid-crystal compounds, to processes and intermediates for the preparation thereof, to the use thereof for optical, electro-optical and electronic purposes, in particular in liquid-crystal media (LC media) and liquid-crystal displays (LC displays), and to LC media and LC displays comprising same.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The commonest display devices are based on the Schadt-Helfrich effect and have a twisted nematic structure. In addition, there are also cells which work with an electric field parallel to the substrate and liquid-crystal plane, such as, for example, IPS (in-plane switching) cells. In particular, TN, STN and IPS cells, especially TN, STN and IPS cells, are currently commercially interesting areas of application for the media according to the invention.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid-crystal displays of this type are known. Examples of non-linear elements which can be used to individually switch the individual pixels are active elements (i.e. transistors). The term "active matrix" is then used, where a distinction can be made between two types:
1. MOS (metal oxide semiconductor) or other diodes on silicon wafers as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are backlit.

The term MLC displays here encompasses any matrix display with integrated non-linear elements, i.e., besides the active matrix, also displays with passive elements, such as varistors or diodes (MIM=metal-insulator-metal).

MLC displays of this type are particularly suitable for TV applications (for example pocket televisions) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable lifetimes. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not satisfy today's requirements.

For TV and video applications, MLC displays having short response times are required. Such short response times can be achieved, in particular, if liquid-crystal media having low values for the viscosity, in particular the rotational viscosity $\gamma_1$, are used. However, diluting additives generally lower the clearing point and thus reduce the working-temperature range of the medium.

Thus, there continues to be a great demand for MLC displays having very high specific resistance at the same time as a large working-temperature range, short response times, even at low temperatures, and a low threshold voltage which do not exhibit these disadvantages or only do so to a lesser extent.

In the case of TN (Schadt-Helfrich) cells, media are desired which facilitate the following advantages in the cells:
  extended nematic phase range (in particular down to low temperatures)

ability to switch at extremely low temperatures (outdoor use, automobiles, avionics)

increased resistance to UV radiation (longer life)

low threshold voltage.

The media available from the prior art do not enable these advantages to be achieved while simultaneously retaining the other parameters.

In the case of supertwisted (STN) cells, media are desired which facilitate greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

In the case of LC displays for TV and video applications (for example LCD TVs, monitors, PDAs, notebooks, games consoles), a significant reduction in the response times is desired. There is therefore a demand for compounds for LC media which facilitate a reduction in the response times without simultaneously impairing the other properties of the LC medium, such as, for example, the clearing point, the dielectric anisotropy $\Delta\epsilon$ or the birefringence $\Delta n$. Low rotational viscosities, in particular, are desirable for this purpose.

In the case of applications of LC media having positive dielectric anisotropy, fast response times are generally demanded. It is known that a reduction in the layer thickness d of the LC medium in the LC cell theoretically results in a reduction in the response times. LC media having relatively high birefringence values $\Delta n$ are therefore required for this purpose in order to ensure an adequate optical retardation $d \cdot \Delta n$. On the other hand, however, LC media having relatively high birefringence values typically also have relatively high values of the rotational viscosity, which in turn results in longer response times. The shortening of the response time achieved by reducing the layer thickness is thus at least partly compensated again by the relatively high rotational viscosity of the LC medium used.

There is therefore an urgent demand for LC compounds and LC media which simultaneously have high birefringence values and low rotational viscosities.

The invention is based on the object of providing LC compounds and LC media, in particular for MLC, TN, STN or IPS displays of this type, which have the desired properties indicated above and do not exhibit the disadvantages indicated above or only do so to a lesser extent. In particular, the LC compounds and LC media according to the invention should have fast response times and low rotational viscosities at the same time as high dielectric anisotropy and high birefringence. In addition, the LC media should have a high clearing point, a broad nematic phase range and a low threshold voltage.

It has now been found that this object can be achieved if LC compounds based on alkynylphenylbicyclohexyl derivatives are used in LC media and LC displays. These compounds result in LC media having the desired properties indicated above.

DE 32 46 440 A1 discloses alkynyl compounds of the following general formula:

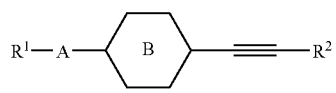

in which B denotes 1,4-phenylene or 1,4-cyclohexane, and A stands for a group having 1 to 3 six-membered rings. $R^1$ can be, inter alia, a straight-chain alkyl group having 1 to 9 carbon atoms. $R^2$ is hydrogen, cyano or a straight-chain alkyl group having 1 to 7 carbon atoms.

According to DE 32 46 440 A1, particularly preferred compounds are those having not more than two rings in the skeleton.

In addition, DE 32 46 440 A1 discloses preferred compounds in which the ring B with the group A can form, for example, a central unit of the following formula:

in which one of the rings $A^4$, $A^5$ and B denotes 1,4-phenylene and the others denote 1,4-phenylene or trans-1,4-disubstituted cyclohexane. As preferred example, DE 32 46 440 A1 gives compounds of the sub-formula XXVI:

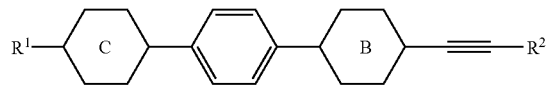

XXVI in which the rings B and C denote 1,4-phenylene or trans-1,4-disubstituted cyclohexane, and $R^1$ and $R^2$ have the meaning indicated above. However, specific examples are not disclosed.

Furthermore, DE 32 46 440 A1 discloses numerous nitrile compounds in which the radical $R^2$ in the general formula

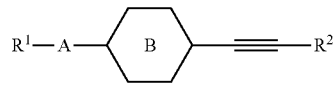

denotes CN. However, nitrile compounds and in particular alkynylnitrile compounds are unsuitable for use in modern AM displays since they result in a poor voltage holding ratio (VHR) and thus in poor reliability of the liquid-crystal mixture.

A main requirement of liquid-crystalline compounds is a good ratio of rotational viscosity to clearing point. Furthermore, individual compounds are required which combine this requirement with high absolute values for the clearing point. This can often only be achieved by compounds whose skeleton has three or more cyclic units ("tricyclic compounds").

However, compounds having two cyclic units in the skeleton are particularly preferred in DE 32 46 440 A1. The example compounds indicated for this do not exhibit sufficiently high values for the absolute clearing point.

The few examples of so-called tricyclic compounds mentioned in DE 32 46 440 A1 likewise have comparatively low clearing points and in addition poor phase properties. Thus, for example, the compound of the following formula:

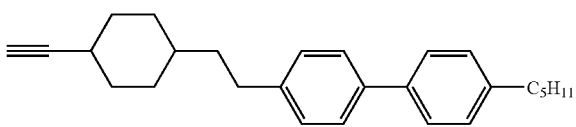

disclosed in DE 32 46 440 A1 is smectic over a broad range, and the clearing point is relatively low. Indeed, the compound of the following formula:

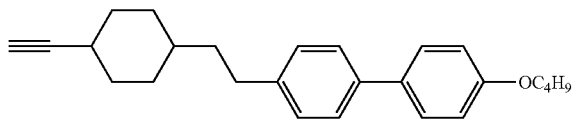

disclosed in DE 32 46 440 A1 exhibits no liquid-crystalline behaviour at all.

It has likewise been found that possible compounds derived from the sub-formula XXVI

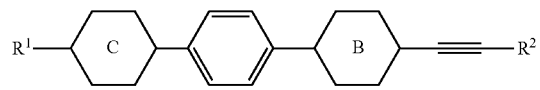

XXVI preferred in DE 32 46 440 A1 are unsuitable or of only poor suitability for giving sufficiently stable (in particular UV-stable) liquid-crystalline compounds, or compounds having a good ratio of rotational viscosity to clearing point.

If B in this formula XXVI represents, for example, a 1,4-phenylene unit, biphenylacetylenes are obtained. These compounds are significantly less UV-stable than, for example, phenylacetylenes and generally cannot be used for modern AM applications, since this results in poor reliability. Compounds of the sub-formula XXVI in which the rings B and C represent 1,4-phenylene units appear even less suitable.

If, by contrast, the alkynyl group is bonded directly to a trans-1,4-cyclohexylene unit, compounds having lower clearing points and a worse ratio of rotational viscosity to clearing point overall are obtained.

EP 0 501 268 B1 describes compounds of the general formula

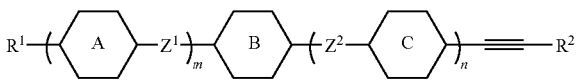

in which the ring B represents a 2,3-difluorophenylene unit. The rings A and C can be, independently of one another, inter alia, equal to 1,4-phenylene or denote a trans-1,4-disubstituted cyclohexane. The parameters m and n can denote 0, 1 or 2, where the sum m+n is 1 or 2. The radicals $R^1$ and $R^2$ can denote an alkyl chain having 1 to 10 carbon atoms.

However, it has been found that the lateral fluorination generally causes in some cases a significant reduction in the absolute clearing points compared with unfluorinated compounds and means that less-broad nematic phases are obtained. In addition, the lateral fluorination generally additionally increases the rotational viscosity.

Thus, there continues to be a great demand for LC compounds and LC media having high birefringence and at the same time broad nematic phases, low rotational viscosity and high specific resistance.

The present invention relates to compounds of the formula I

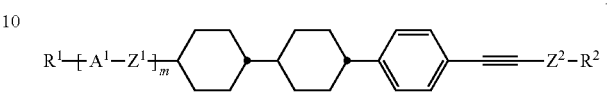

I in which the individual radicals have the following meanings:

$R^1$ and $R^2$ denote H, F, Cl, Br, —CN, —SCN, —NCS, $SF_5$ or straight-chain or branched alkyl having 1 to 12 C atoms, in which, in addition, one or more non-adjacent $CH_2$ groups may each be replaced, independently of one another, by —CH=CH—, —C≡C—, —CO—, —CO—O—, —O—CO—, —O—CO—O— in such a way that O and/or S atoms are not linked directly to one another, and in which, in addition, one or more H atoms may be replaced by F, Cl or Br, or P-Sp-, P denotes a polymerisable group, Sp denotes a spacer group or a single bond, $A^1$ on each occurrence, identically or differently, denotes phenylene-1,4-diyl, in which, in addition, one or two CH groups may be replaced by N and one or more H atoms may be replaced by halogen, CN, $CH_3$, $CHF_2$, $CH_2F$, $OCH_3$, $OCHF_2$ or $OCF_3$, cyclohexane-1,4-diyl, in which, in addition, one or two non-adjacent $CH_2$ groups may be replaced, independently of one another, by O and/or S, and one or more H atoms may be replaced by F, cyclohexene-1,4-diyl, bicyclo[1.1.1]pentane-1,3-diyl, bicyclo-[2.2.2]octane-1,4-diyl, spiro[3.3]heptane-2,6-diyl, tetrahydropyran-2,5-diyl or 1,3-dioxane-2,5-diyl, $Z^1$ and $Z^2$ each, independently of one another, denote —$CF_2O$—, —$OCF_2$—, —$CH_2O$—, —$OCH_2$—, —$C_2H_4$—, —$C_2F_4$—, —$CF_2CH_2$—, —$CH_2CF_2$—, —CFHCFH—, —CFHCH$_2$—, —CH$_2$CFH—, —CF$_2$CFH—, —CFHCF$_2$—, —CH=CH—, —CF=CH—, —CH=CF—, —CF=CF—, —C≡C— or a single bond, and m denotes 0, 1, 2 or 3.

The invention furthermore relates to an LC medium comprising one or more compounds of the formula I, preferably a medium comprising two or more compounds, which are preferably liquid-crystalline or mesogenic. The LC medium is preferably nematic.

The invention furthermore relates to novel processes for the preparation of compounds of the formula I, and to intermediates obtained or used therein.

The invention furthermore relates to the use of compounds of the formula I and LC media according to the invention in electro-optical displays, in particular LC displays.

The invention furthermore relates to an LC display containing one or more compounds of the formula I or an LC medium according to the invention, in particular an MLC, TN, STN or IPS display.

In the compounds of the formula I, m preferably denotes 0, 1 or 2, particularly preferably 0 or 1, very particularly preferably 0.

$A^1$ is preferably selected from the following radicals:

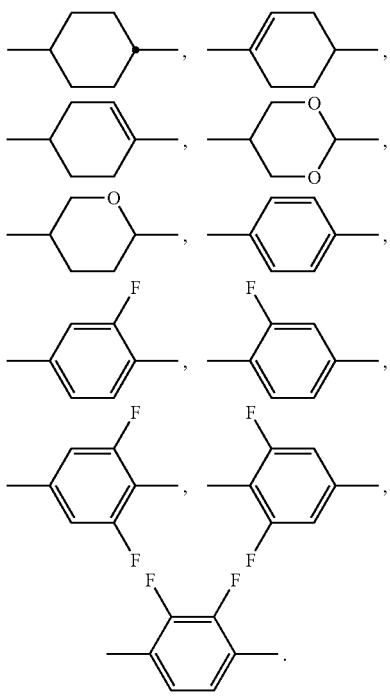

$A^1$ particularly preferably denotes trans-1,4-cyclohexylene.

$Z^1$ and $Z^2$ preferably denote a single bond. The definitions of $Z^2$ and $R^2$ are jointly selected so that O atoms are not adjacent.

$R^1$ preferably denotes H, F, Cl, Br, CN, NCS, $SF_5$, $CF_3$, $OCF_3$, $OCHF_2$, furthermore alkyl or alkoxy having 1 to 8 C atoms or alkenyl or alkynyl having 2 to 6 C atoms, where these radicals may also be mono- or polysubstituted by halogen, preferably F, and, in addition, one or more non-adjacent $CH_2$ groups in these radicals may be replaced by O or S.

$R^1$ particularly preferably denotes H, alkyl or alkoxy having 1 to 5 C atoms or alkenyl having 2 to 6 C atoms.

$R^2$ preferably denotes H, alkyl or alkoxy having 1 to 8 C atoms or alkenyl or alkynyl having 2 to 6 C atoms, where these radicals may also be mono- or polysubstituted by halogen, preferably F, and, in addition, one or more non-adjacent $CH_2$ groups in these radicals may be replaced by O or S.

$R^2$ particularly preferably denotes H or alkyl having 1 to 5 C atoms, in particular 1 to 3 C atoms, very particularly preferably methyl.

The alkyl, alkoxy, alkenyl or alkynyl radicals may each be straight-chain or branched. Particular preference is given to straight-chain alkyl radicals.

$R^1$ and $R^2$ particularly preferably each, independently of one another, denote alkyl, preferably straight-chain alkyl, having 1 to 5 C atoms.

Preferred alkyl groups are, for example, methyl, ethyl, n-propyl, n-butyl, n-pentyl, n-hexyl, n-heptyl and n-octyl.

Preferred alkenyl groups are, for example, ethenyl, propenyl, butenyl and pentenyl.

Preferred alkynyl groups are, for example, ethynyl, propynyl, butynyl, pentynyl, hexynyl, heptynyl and octynyl.

Preferred alkoxy groups are, for example, methoxy, ethoxy, n-propoxy, n-butoxy, n-pentoxy, n-hexoxy, n-heptoxy, n-octoxy.

Halogen preferably denotes F or Cl.

LC media which have an achiral LC phase without the presence of chiral dopants, and compounds of the formula I in which the radicals $Z^{1,2}$, $A^1$, $R^{1,2}$ do not have a centre of chirality are generally preferred.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or C≡C triple bond, and groups which are suitable for polymerisation with ring opening, such as, for example, oxetane or epoxide groups.

Preferred groups P are selected from $CH_2$=$CW^1$—COO—, $CH_2$=$CW^1$—CO—,

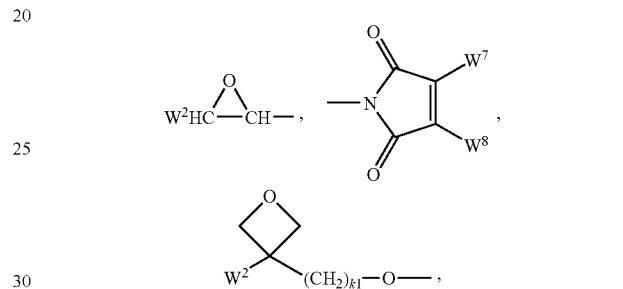

$CH_2$=$CW^2$—(O)$_{k3}$—, $CH_3$—CH=CH—O—, ($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—, HO—$CW^2W^3$—, HS—$CW^2W^3$—, H$W^2$N—, HO—$CW^2W^3$—NH—, $CH_2$=$CW^1$—CO—NH—, $CH_2$=CH—(COO)$_{k1}$-Phe-(O)$_{k2}$—, $CH_2$=CH—(CO)$_{k1}$-Phe-(O)$_{k2}$—, Phe-CH=CH—, HOOC—, OCN— and $W^4W^5W^6$Si—, in which $W^1$ denotes H, F, Cl, CN, $CF_3$, phenyl or alkyl having 1 to 5 C atoms, in particular H, F, $C_1$ or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above, $k_1$, $k_2$ and $k_3$ each, independently of one another, denote 0 or 1, and $k_3$ preferably denotes 1.

Particularly preferred groups P are $CH_2$=$CW^1$—COO—, in particular $CH_2$=CH—COO—, $CH_2$=C($CH_3$)—COO— and $CH_2$=CF—COO—, furthermore $CH_2$=CH—O—, $CH_2$=$CH_2$CH—OCO—, ($CH_2$=CH)$_2$CH—O—,

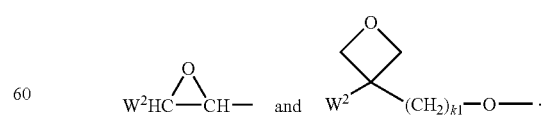

Very particularly preferred groups P are vinyloxy, acrylate, methacrylate, fluoroacrylate, chloroacrylate, oxetane and epoxide.

The term "spacer group", also referred to as "Sp" above and below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless indicated otherwise, the term "spacer group" or "spacer" above and below denotes a flexible group which connects the mesogenic group and the polymerisable group(s) to one another in a polymerisable liquid-crystalline or mesogenic compound.

Preferred spacer groups Sp are selected from the formula Sp'-X', so that the radical P-Sp- corresponds to the formula P-Sp'-X'—, where Sp' denotes alkylene having 1 to 20, preferably 1 to 12, C atoms, which is optionally mono- or polysubstituted by F, Cl, Br, I or CN, and in which, in addition, one or more non-adjacent CH$_2$ groups may each be replaced, independently of one another, by —O—, —S—, —NH—, —NR$^0$—, —SiR$^{00}$R$^{000}$—, —CO—, —COO—, —OCO—, —OCO—O—, —S—CO—, —CO—S—, —NR$^{00}$—CO—O—, —O—CO—NR$^{00}$—, —NR$^{00}$—CO—NR$^{00}$—, —CH=CH— or —C≡C— in such a way that O and/or S atoms are not linked directly to one another, X' denotes —O—, —S—, —CO—, —COO—, —OCO—, —O—COO—, —CO—NR$^{00}$—, —NR$^{00}$—CO—, —NR$^{00}$—CO—NR$^{00}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—COO—, —OCO—CH=CH— or a single bond, R$^{00}$ and R$^{000}$ each, independently of one another, denote H or alkyl having 1 to 12 C atoms, and Y$^2$ and Y$^3$ each, independently of one another, denote H, F, Cl or CN.

X' is preferably —O—, —S—, —CO—, —COO—, —OCO—, —O—COO—, —CO—NR$^0$—, —NR$^0$—CO—, —NR$^0$—CO—NR$^0$— or a single bond.

Typical spacer groups Sp' are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^{00}$R$^{000}$—O)$_{p1}$—, in which p1 is an integer from 1 to 12, q1 is an integer from 1 to 3, and R$^{00}$ and R$^{000}$ have the meanings indicated above.

Particularly preferred groups —X'-Sp'- are —(CH$_2$)$_{p1}$—, —O—(CH$_2$)$_{p1}$—, —OCO—(CH$_2$)$_{p1}$—, —OCOO—(CH$_2$)$_{p1}$—.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

Particularly preferred compounds of the formula I are selected from the following sub-formulae:

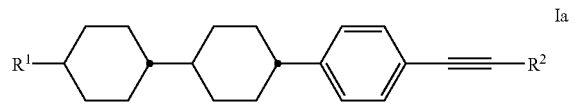
Ia

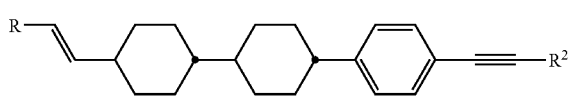
Ib

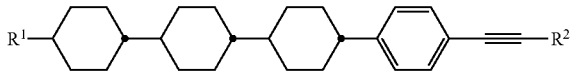
Ic in which R$^1$ and R$^2$ have the meanings indicated above and below, and R denotes H or alkyl having 1 to 4 C atoms. R$^1$ and R$^2$ therein preferably denote optionally fluorinated alkyl, alkenyl, alkynyl or alkoxy having 1 to 12 C atoms, particularly preferably optionally fluorinated alkyl, alkenyl or alkynyl having 1 to 5 C atoms.

The compounds of the formula I can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

Particularly preferred processes for the preparation of compounds of the formula I are indicated below. The schemes shown therein are intended to illustrate these processes without restricting them. R$^1$, A$^1$, Z$^1$ and m therein have the meanings indicated in formula I.

Central intermediates for the preferred synthesis of compounds of the formula I are the compounds 6. These intermediates are preferably prepared as described in Scheme 1.

Scheme 1: Synthesis of the compounds 6

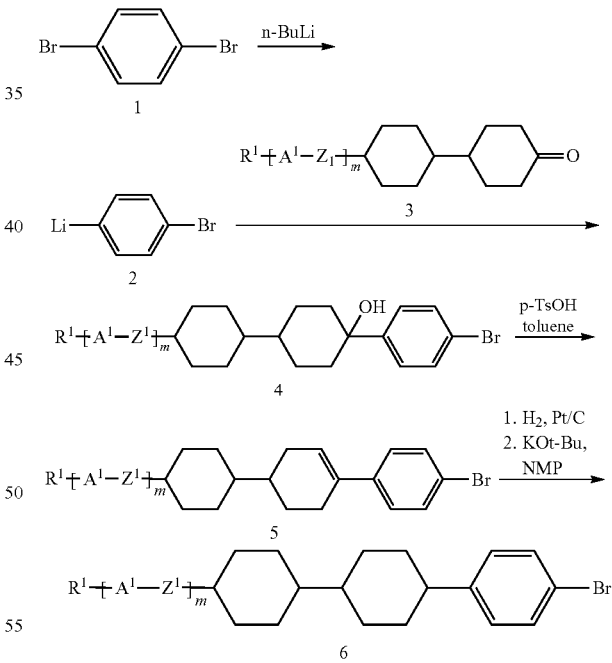

Addition of the organolithium compound 2 obtained from 1,4-dibromobenzene 1 onto the ketones 3 gives the alcohols 4. The alkenes 5 formed after elimination of water are hydrogenated, and the resultant mixture is isomerised using potassium tert-butoxide in NMP to give the preferred isomer of the compounds 6.

The alkynyl side chain is then introduced by Sonogashira coupling to suitable alkynes 7, as shown by way of example in Scheme 2.

Scheme 2: Synthesis of the compounds I by Sonogashira coupling

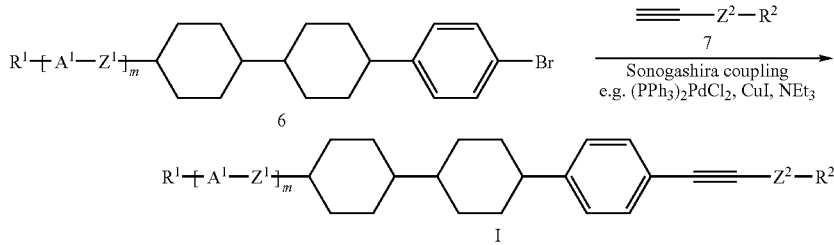

The Sonogashira coupling can also be carried out with trimethylsilylacetylene. Further functionalisation possibilities starting from the compounds 9 then arise, as shown by way of example in Scheme 3.

Scheme 3: Sonogashira couplings of the compounds 6 to trimethylsilylacetylene

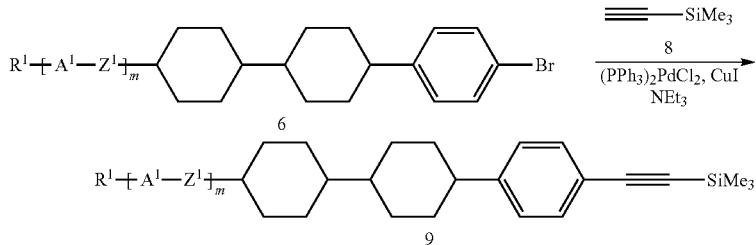

Reaction of the acetylene 9 with potassium carbonate in methanol gives the compounds 10 (corresponds to I where $Z^2$=single bond and $R^2$=H). This corresponds formally to the product of a Sonogashira coupling of compound 6 to acetylene. These terminal acetylenes can be deprotonated using suitable bases to give corresponding acetylides 11 (here: lithium acetylide of the compound 10). These intermediates can be functionalised further, for example by alkylation using suitable alkylating agents. This can be carried out under suitable conditions, for example using iodides ($R^2$—I), wherein $R^2$ has the meaning indicated for the compound of formula I, as shown by way of example in Scheme 4.

Scheme 4: Desilylation of the compounds 9 and alkylation of the compounds 10

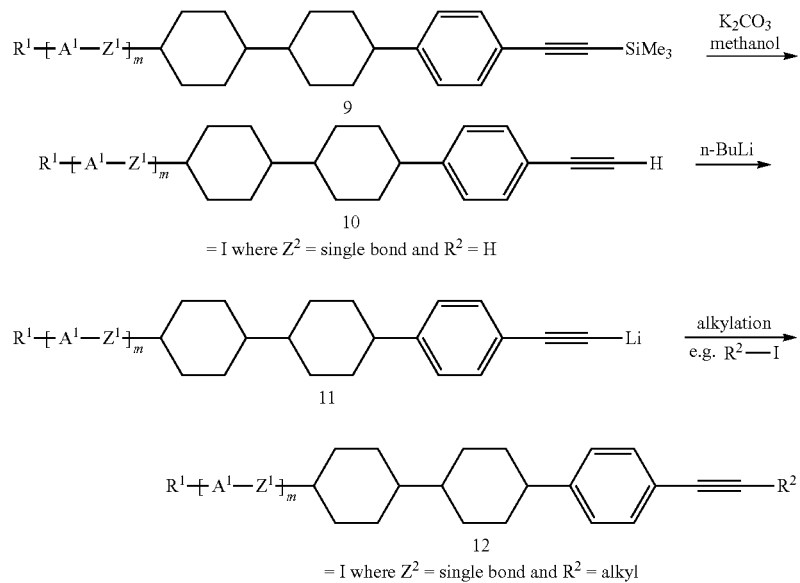

A further possibility for functionalisation of the compound 10 using alkyl halides is the Kumada-Corriu reaction, as shown by way of example in Scheme 4. A variant is described in the literature [L.-M-Yang, L.-F. Huang, T.-Y. Luh, *Org. Lett.* 2004, 6, 1461-1463].

Scheme 5: Alkylation of the compounds 10 via the Kumada-Corriu reaction

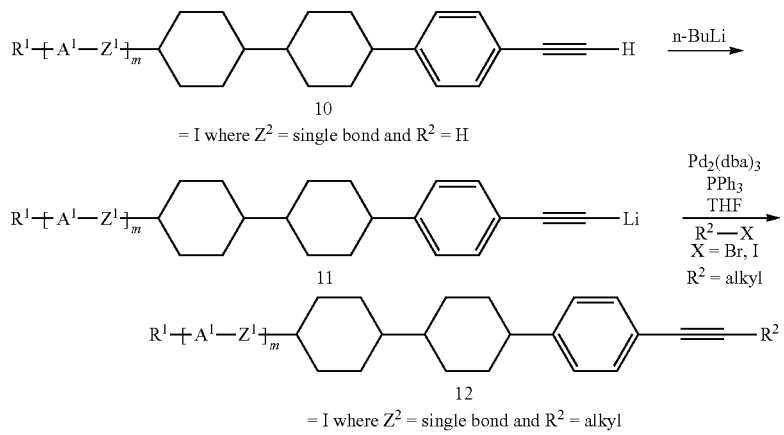

The reaction schemes shown should only be regarded as illustrative. The person skilled in the art will be able to carry out corresponding variations of the syntheses presented and also follow other suitable synthetic routes in order to obtain compounds of the formula I.

The present invention furthermore relates to the processes described above and below and to the novel intermediates produced or used therein, and to the use thereof for the preparation of compounds of the formula I according to the invention.

Particular preference is given to a process for the preparation of compounds of the formula I comprising the following steps (a to f1, or a to e and f2 to i2, or a to e and f2 to h2 and i3):

a) metallation of 1,4-dihalobenzene in one halogen position, preferably 1,4-dibromobenzene, preferably using an organometallic reagent, for example alkyllithium compounds, b) addition of the organometallic compound obtained in step a) onto a ketone of the following formula:

c) elimination of water from the alcohol obtained in step b),
d) hydrogenation of the alkene obtained in step c),
e) optionally isomerisation of the mixture obtained in step d) to give the preferred isomer (trans-trans isomer of the bicyclohexyl group) of the following formula:

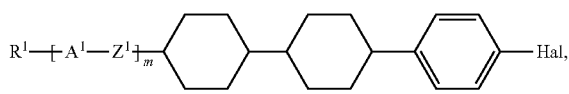

f1) Sonogashira coupling of the halogen compound obtained in step e) to a suitable axlkyne of the formula HC≡C—Z²—R², in which R² and Z² have the meanings indicated in Claim 1, or f2) Sonogashira coupling of the halogen compound obtained in step e) to trialkylsilylacetylene, g2) desilylation of the acetylene obtained in step f2), h2) deprotonation of the terminal acetylene in step g2) using a base, i2) alkylation of the acetylide obtained in step h2) using an alkylating agent, for example an iodide of the formula R²—I, wherein R² has the meaning indicated for the compound of formula I, or i3) reaction of the acetylide obtained in step h2) with a haloalkane in a Kumada-Corriu reaction,
where R¹, A¹ and Z¹ have the meanings indicated in Claim 1, and Hal denotes halogen.

Particularly preferred LC media according to the invention are mentioned below:
LC medium which additionally comprises one or more compounds of the formulae II and/or III:

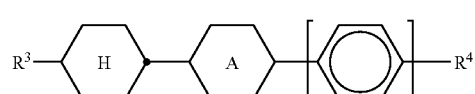

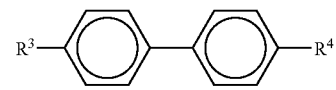

in which
A denotes 1,4-phenylene or trans-1,4-cyclohexylene,
a is 0 or 1,
$R^3$ denotes alkenyl having 2 to 9 C atoms, and
$R^4$ denotes alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, and preferably denotes alkyl having 1 to 12 C atoms or alkenyl having 2 to 9 C atoms.

The compounds of the formula II are preferably selected from the group consisting of the following formulae:

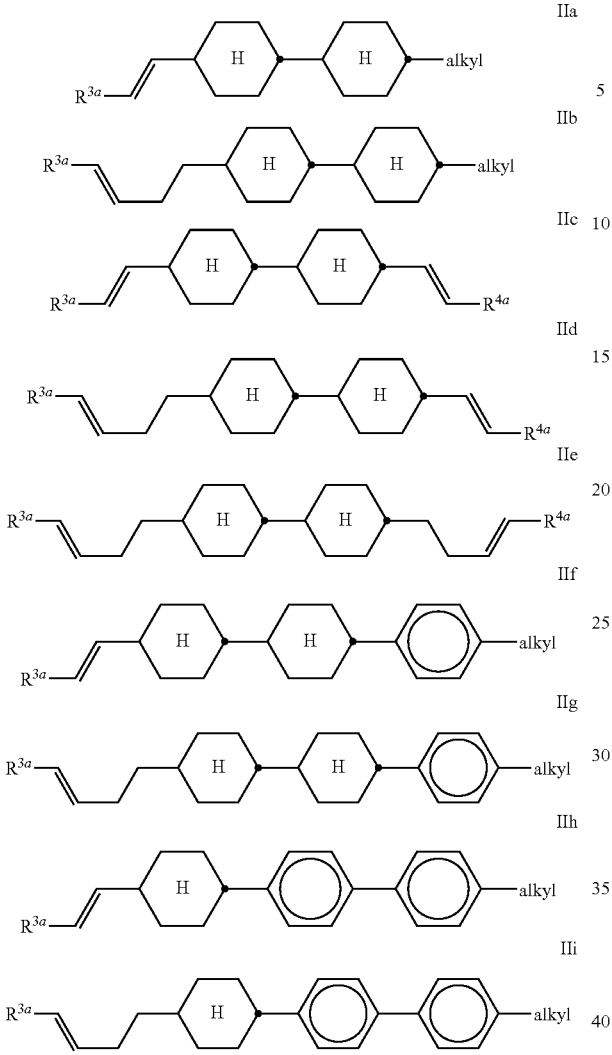

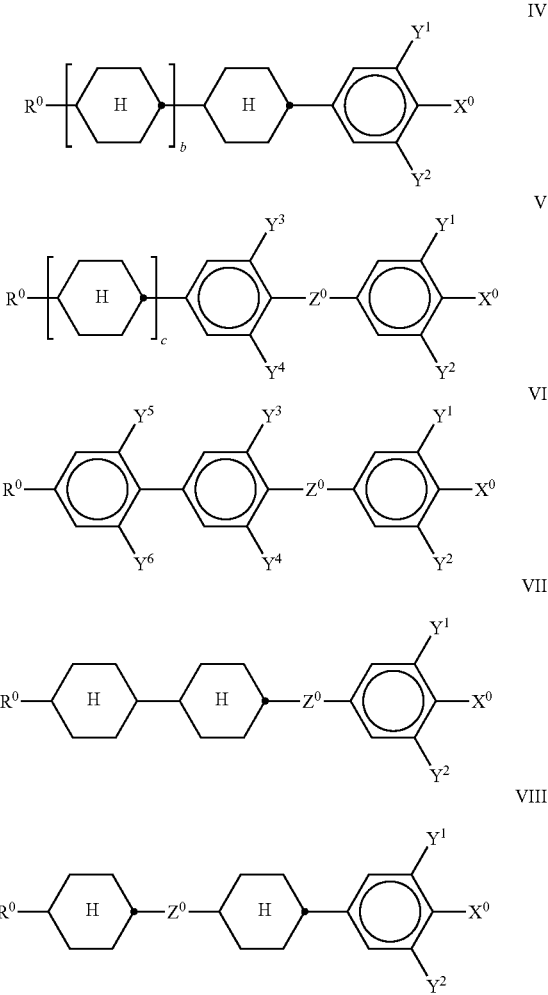

in which $R^{3a}$ and $R^{4a}$ each, independently of one another, denote H, CH$_3$, C$_2$H$_5$ or C$_3$H$_7$, and "alkyl" denotes a straight-chain alkyl group having 1 to 8, preferably 1, 2, 3, 4 or 5, C atoms. Particular preference is given to compounds of the formulae IIa and IIf, in particular in which $R^{3a}$ denotes H or CH$_3$, preferably H, and compounds of the formula IIc, in particular in which $R^{3a}$ and $R^{4a}$ denote H, CH$_3$ or C$_2$H$_5$.

The compounds of the formula III are preferably selected from the group consisting of the following formulae:

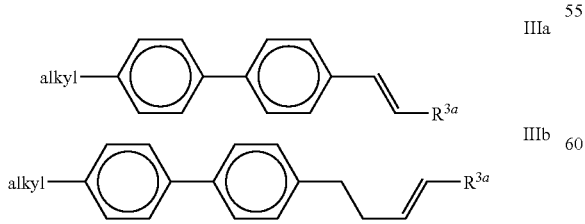

in which "alkyl" and $R^{3a}$ have the meanings indicated above, and $R^{3a}$ preferably denotes H or CH$_3$. Particular preference is given to compounds of the formula IIIb;

LC medium which additionally comprises one or more compounds selected from the group consisting of the following formulae:

in which $R^0$ denotes an alkyl or alkoxy radical having 1 to 15 C atoms, where, in addition, one or more CH$_2$ groups in these radicals may each be replaced, independently of one another, by —C≡C—, —CF$_2$O—, —CH=CH—,

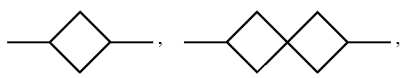

—O—, —CO—O— or —O—CO— in such a way that O atoms are not linked directly to one another, and in which, in addition, one or more H atoms may be replaced by halogen, $X^0$ denotes F, Cl, CN, SF$_5$, SCN, NCS, a halogenated alkyl radical, halogenated alkenyl radical, halogenated alkoxy radical or halogenated alkenyloxy radical, each having up to 6 C atoms, $Y^{1-6}$ each, independently of one another, denote H or F, $Z^0$ denotes —C$_2$H$_4$—, —(CH$_2$)$_4$—, —CH=CH—, —CF=CF—, —C$_2$F$_4$—, —CH$_2$CF$_2$—, —CF$_2$CH$_2$—, —CH$_2$O—, —OCH$_2$—, —COO—, —CF$_2$O≦ or —OCF$_2$—, in the formulae V and VI also a single bond, and b and c each, independently of one another, denote 0 or 1.

In the compounds of the formulae IV to VIII, $X^0$ preferably denotes F or $OCF_3$, furthermore $OCHF_2$, $CF_3$, $CF_2H$, Cl, $OCH=CF_2$. $R^0$ is preferably straight-chain alkyl or alkenyl, each having up to 6 C atoms.

The compounds of the formula IV are preferably selected from the group consisting of the following formulae:

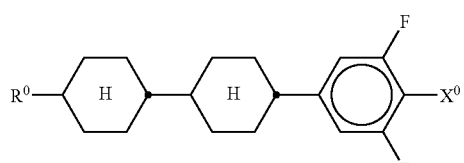
IVa

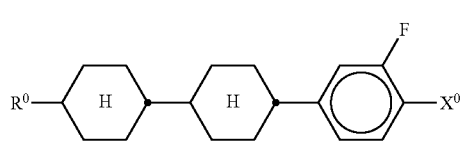
IVb

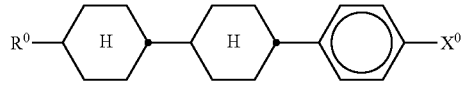
IVc

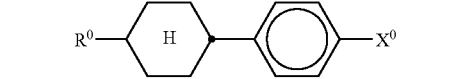
IVd

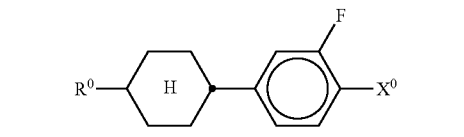
IVe

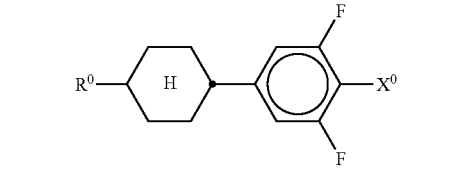
IVf in which $R^0$ and $X^0$ have the meanings indicated above.

Preferably, $R^0$ in formula IV denotes alkyl having 1 to 8 C atoms and $X^0$ denotes F, Cl, $OCHF_2$ or $OCF_3$, furthermore $OCH=CF_2$. In the compound of the formula IVb, $R^0$ preferably denotes alkyl or alkenyl. In the compound of the formula IVd, $X^0$ preferably denotes Cl, furthermore F.

The compounds of the formula V are preferably selected from the group consisting of the following formulae:

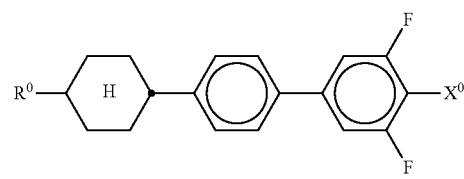
Va

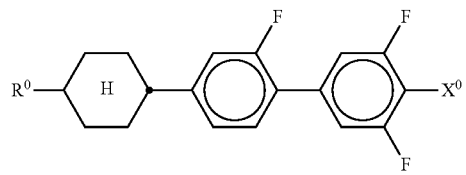
Vb

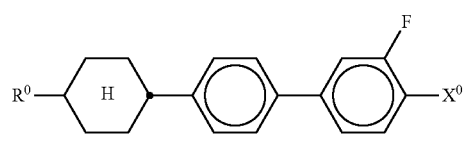
Vc

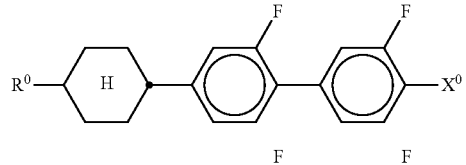
Vd

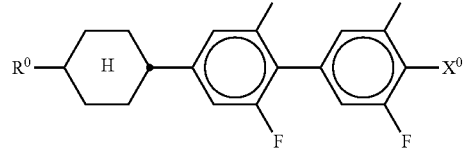
Ve

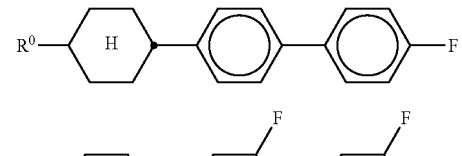
Vf

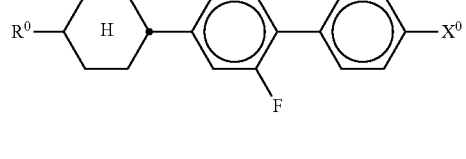
Vg in which $R^0$ and $X^0$ have the meanings indicated above. Preferably, $R^0$ in formula V denotes alkyl having 1 to 8 C atoms and $X^0$ denotes F;

LC medium which comprises one or more compounds of the formula VI-1:

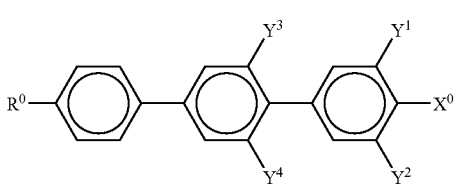
VI-1 particularly preferably those selected from the group consisting of the following formulae:

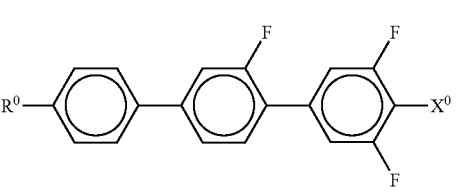
VI-1a

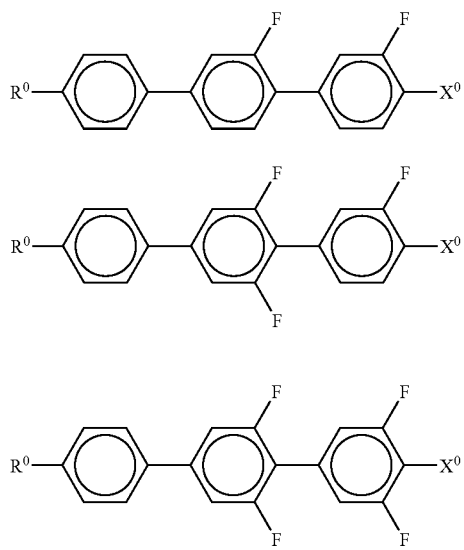

VI-1b

VI-1c

VI-1d in which $R^0$ and $X^0$ have the meanings indicated above. Preferably, $R^0$ in formula VI denotes alkyl having 1 to 8 C atoms and $X^0$ denotes F, furthermore $OCF_3$.

LC medium which comprises one or more compounds of the formula VI-2:

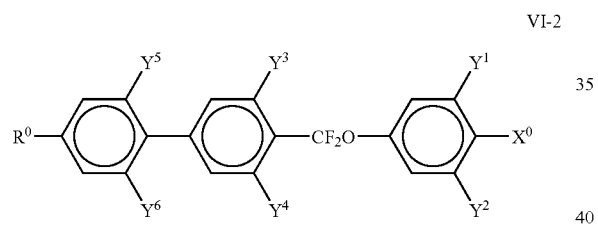

VI-2 particularly preferably those selected from the group consisting of the following formulae:

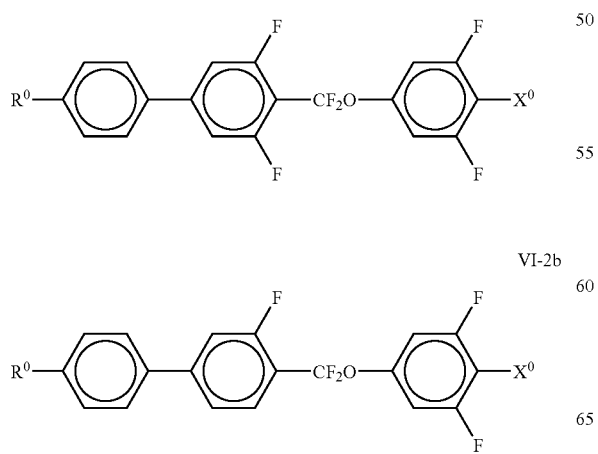

VI-2a

VI-2b

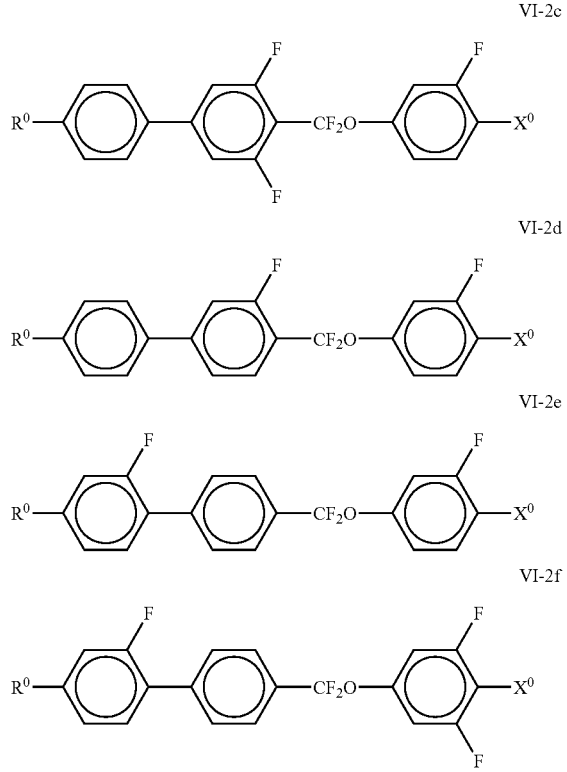

VI-2c

VI-2d

VI-2e

VI-2f in which $R^0$ and $X^0$ have the meanings indicated above.

Preferably, $R^0$ in formula VI denotes alkyl having 1 to 8 C atoms and $X^0$ denotes F;

LC medium which preferably comprises one or more compounds of the formula VII in which $Z^0$ denotes —$CF_2O$—, —$CH_2CH_2$— or —COO—, particularly preferably those selected from the group consisting of the following formulae:

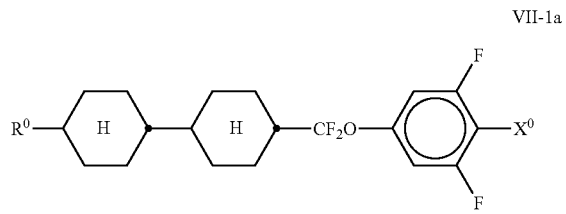

VII-1a

VII-1b

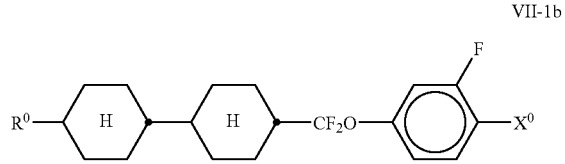

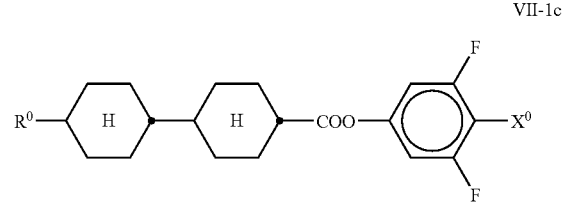

VII-1c

-continued

VII-1d
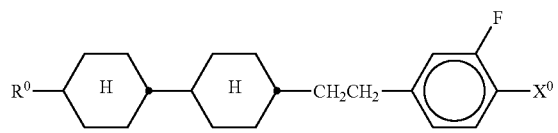

VII-1e
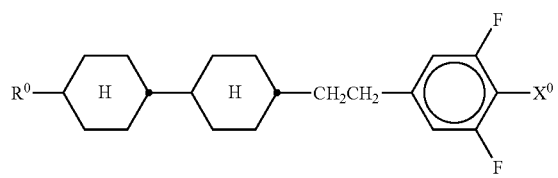

in which R⁰ and X⁰ have the meanings indicated above. Preferably, R⁰ in formula VII denotes alkyl having 1 to 8 C atoms and X⁰ denotes F, furthermore OCF₃.

The compounds of the formula VIII are preferably selected from the group consisting of the following formulae:

VIIIa
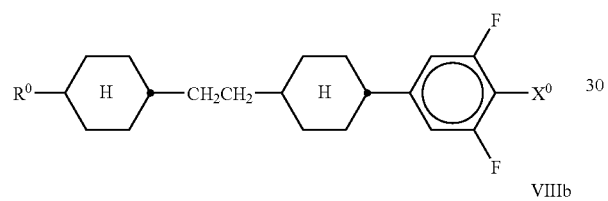

VIIIb
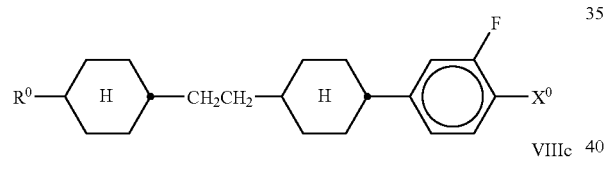

VIIIc
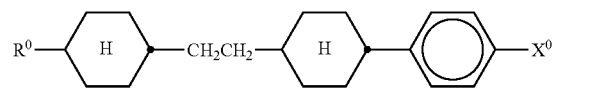

VIIId

VIIIe
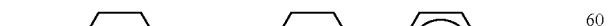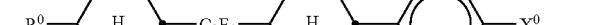

VIIIf
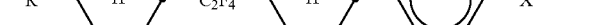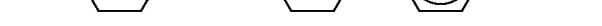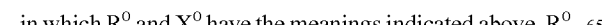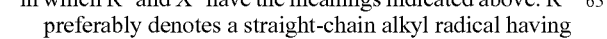

in which R⁰ and X⁰ have the meanings indicated above. R⁰ preferably denotes a straight-chain alkyl radical having 1 to 8 C atoms. X⁰ preferably denotes F.

LC medium which additionally comprises one or more compounds of the following formula:

IX
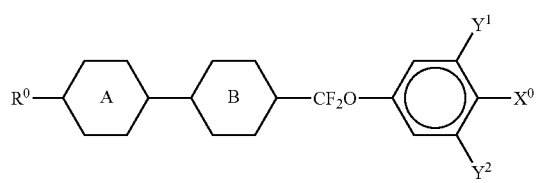

in which R⁰, X⁰, Y¹ and Y² have the meanings indicated above, and

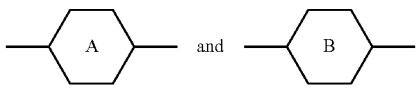

each, independently of one another, denote

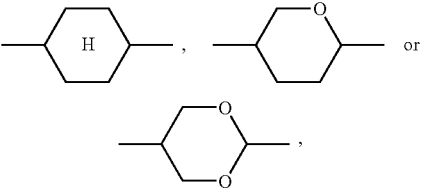

where the rings A and B do not both simultaneously denote cyclohexylene.

The compounds of the formula IX are preferably selected from the group consisting of the following formulae:

IXa
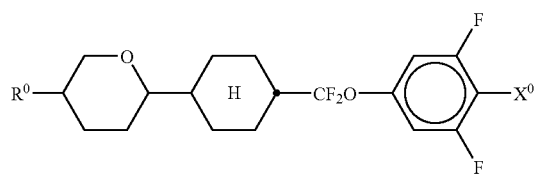

IXb
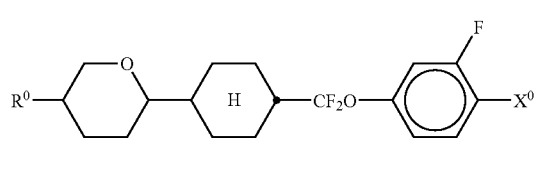

IXc

-continued

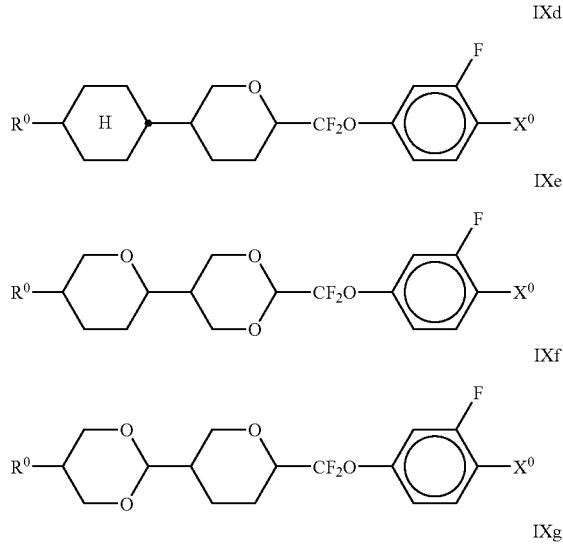

in which $R^0$ and $X^0$ have the meanings indicated above. Preferably, $R^0$ denotes alkyl having 1 to 8 C atoms and $X^0$ denotes F. Particular preference is given to compounds of the formula IXa;

LC medium which additionally comprises one or more compounds selected from the group consisting of the following formulae:

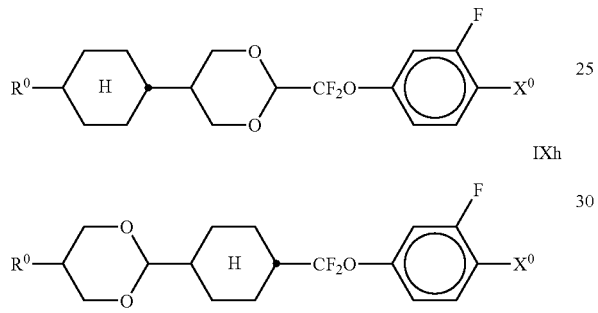

in which $R^0$, $X^0$ and $Y^{1-4}$ have the meanings indicated above, and

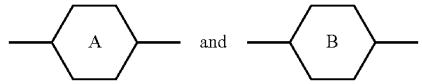

each, independently of one another, denote

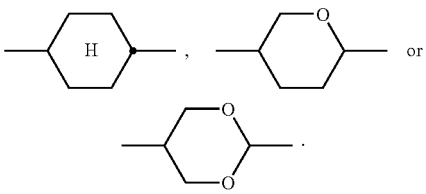

The compounds of the formulae X and XI are preferably selected from the group consisting of the following formulae:

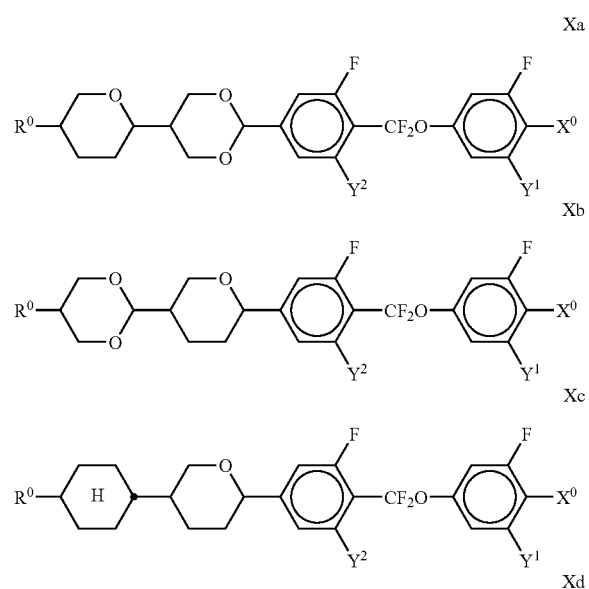

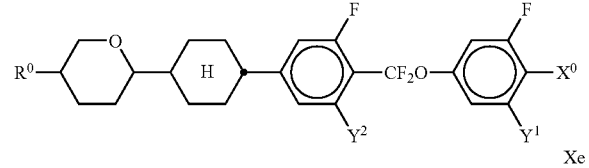

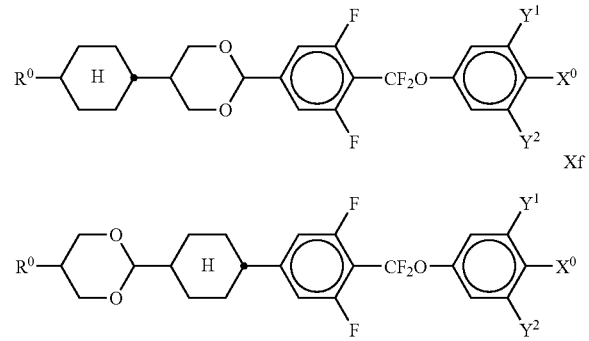

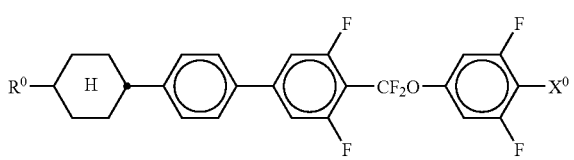

XIa

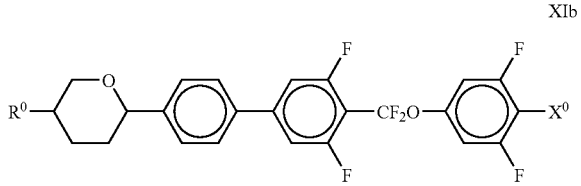

XIb in which $R^0$ and $X^0$ have the meanings indicated above. Preferably, $R^0$ denotes alkyl having 1 to 8 C atoms and $X^0$ denotes F. Particularly preferred compounds are those in which $Y^1$ denotes F and $Y^2$ denotes H or F, preferably F;

LC medium which additionally comprises one or more compounds of the following formula:

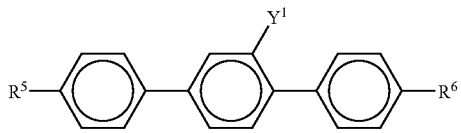

XII in which $R^5$ and $R^6$ each, independently of one another, denote n-alkyl, alkoxy, oxaalkyl, fluoroalkyl or alkenyl, each having up to 9 C atoms, and preferably each, independently of one another, denote alkyl having 1 to 8 C atoms. $Y^1$ denotes H or F.

Preferred compounds of the formula XII are those selected from the group consisting of the following formulae:

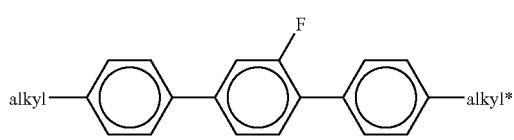

XIIa

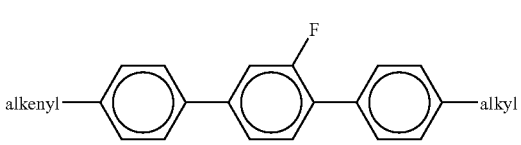

XIIb

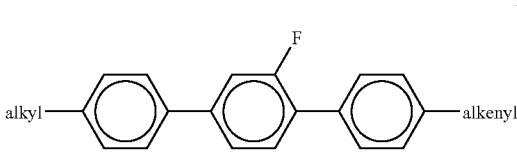

XIIc

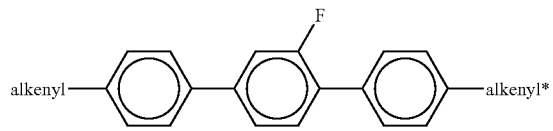

XIId in which
alkyl and alkyl* each, independently of one another, denote a straight-chain alkyl radical having 1 to 6 C atoms, and alkenyl and alkenyl* each, independently of one another, denote a straight-chain alkenyl radical having 2 to 6 C atoms.

LC medium which additionally comprises one or more compounds selected from the group consisting of the following formulae:

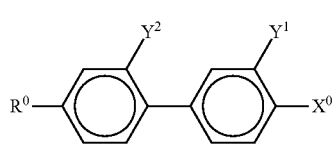

XIII

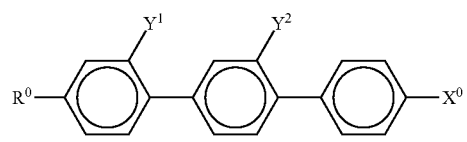

XIV

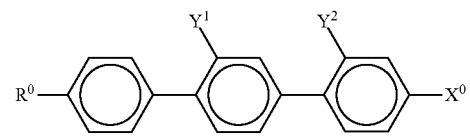

XV

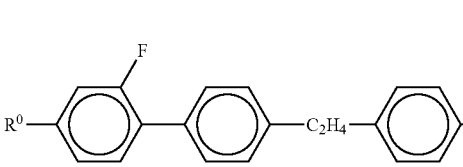

XVI in which $R^0$, $X^0$, $Y^1$ and $Y^2$ have the meanings indicated above. Preferably, $R^0$ denotes alkyl having 1 to 8 C atoms and $X^0$ denotes F or Cl;

the compounds of the formulae XIII and XIV are preferably selected from the group consisting of the following formulae:

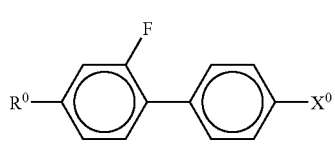

XIIIa

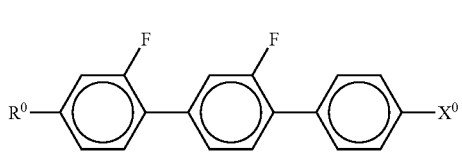

XIVa

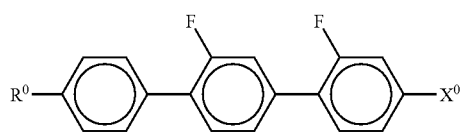

XVa in which R⁰ and X⁰ have the meanings indicated above. R⁰ preferably denotes alkyl having 1 to 8 C atoms. In the compounds of the formula XIII, X⁰ preferably denotes F or Cl.

LC medium which additionally comprises one or more compounds of the formulae D1 and/or D2:

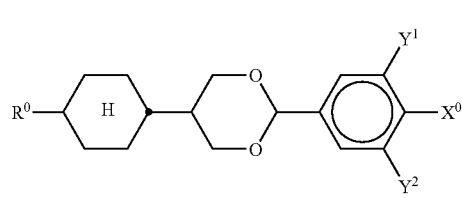

D1

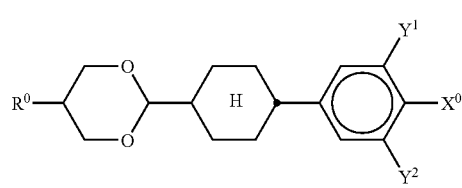

D2 in which $Y^1$, $Y^2$, $R^0$ and $X^0$ have the meanings indicated above. Preferably, $R^0$ denotes alkyl having 1 to 8 C atoms and $X^0$ denotes F. Particular preference is given to compounds of the following formulae:

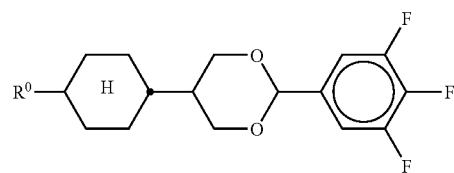

D1-1

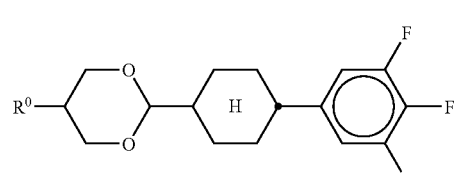

D2-1 in which $R^0$ has the meanings indicated above and preferably denotes straight-chain alkyl having 1 to 6 C atoms, in particular $C_2H_5$, n-$C_3H_7$ or n-$C_5H_{11}$.

LC medium which additionally comprises one or more compounds of the following formula:

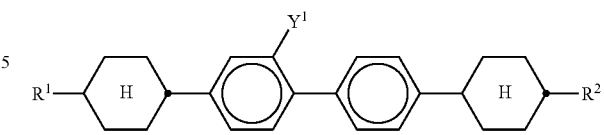

XVII in which $Y^1$, $R^1$ and $R^2$ have the meanings indicated above. $R^1$ and $R^2$ preferably each, independently of one another, denote alkyl having 1 to 8 C atoms;

LC medium which additionally comprises one or more compounds of the following formula:

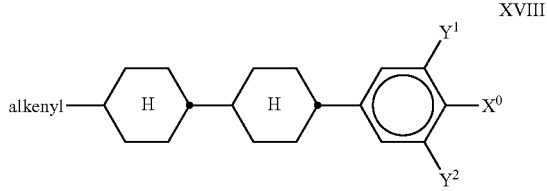

XVIII in which $X^0$, $Y^1$ and $Y^2$ have the meanings indicated above, and "alkenyl" denotes $C_{2-7}$-alkenyl. Particular preference is given to compounds of the following formula:

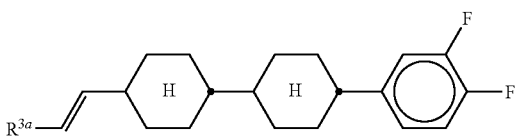

XVIIIa in which $R^{3a}$ has the meaning indicated above and preferably denotes H;

LC medium which additionally comprises one or more tetracyclic compounds selected from the group consisting of the formulae XIX to XXV:

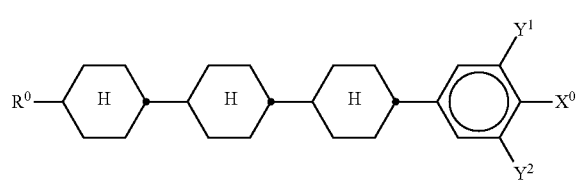

XIX

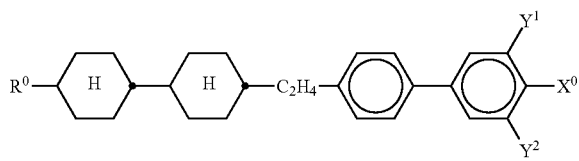

XX

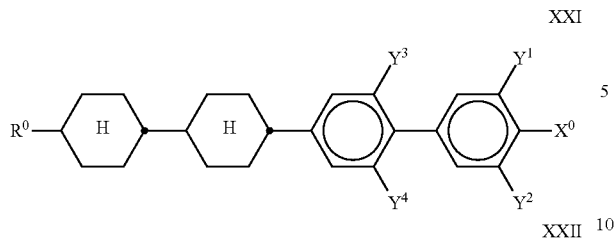
XXI

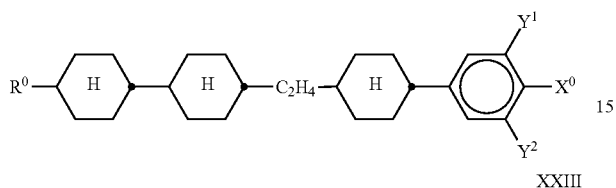
XXII

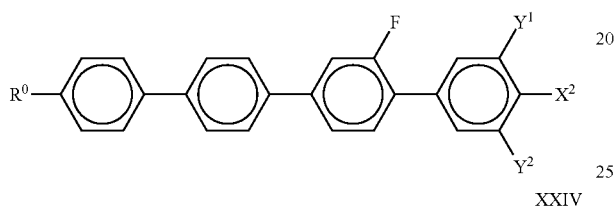
XXIII

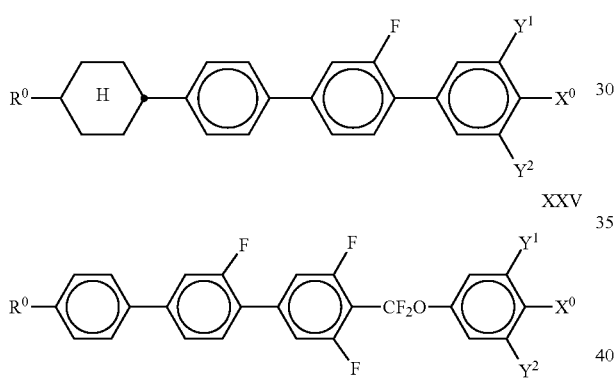
XXIV

XXV

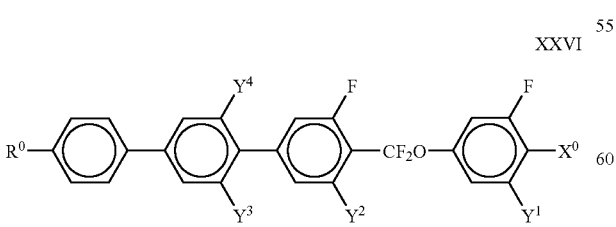
XXVI in which $Y^{1-4}$, $R^0$ and $X^0$ each, independently of one another, have one of the meanings indicated above. $X^0$ is preferably F, Cl, $CF_3$, $OCF_3$ or $OCHF_2$. $R^0$ preferably denotes alkyl, alkoxy, oxaalkyl, fluoroalkyl or alkenyl, each having up to 8 C atoms.

LC medium which additionally comprises one or more compounds of the following formula:

in which $R^0$, $X^0$ and $Y^1$-4 have the meanings indicated above. Particular preference is given to compounds of the following formula:

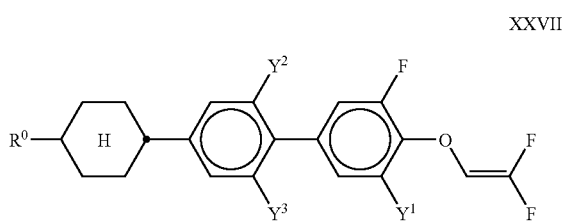
XXVIa

LC medium which additionally comprises one or more compounds of the following formula:

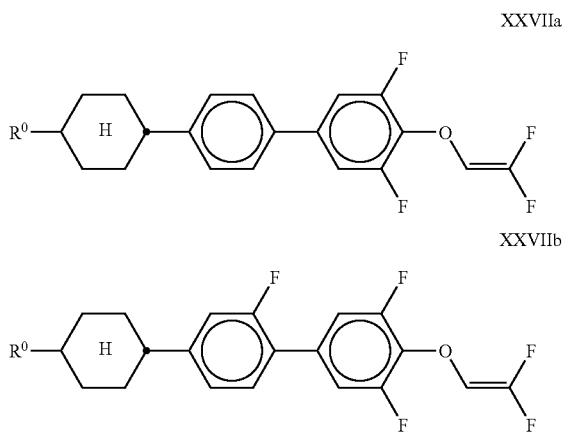
XXVII in which $R^0$ and $Y^{1-3}$ have the meanings indicated above. Particular preference is given to compounds of the following formulae:

XXVIIa

XXVIIb in which $R^0$ has the meaning indicated above and preferably denotes alkyl, alkoxy, oxaalkyl, fluoroalkyl or alkenyl, each having up to 8 C atoms.

LC medium which additionally comprises one or more compounds of the following formula:

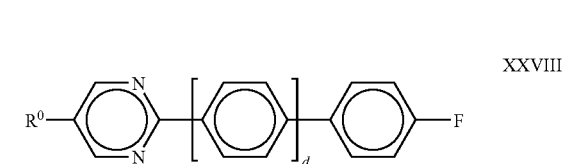
XXVIII in which $R^0$ has the meaning indicated above and is preferably straight-chain alkyl having 2-5 C atoms, and d denotes 0 or 1, preferably 1. Preferred mixtures comprise 3-30% by weight, in particular 5-20% by weight, of this (these) compound(s).

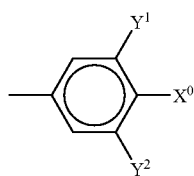

is preferably

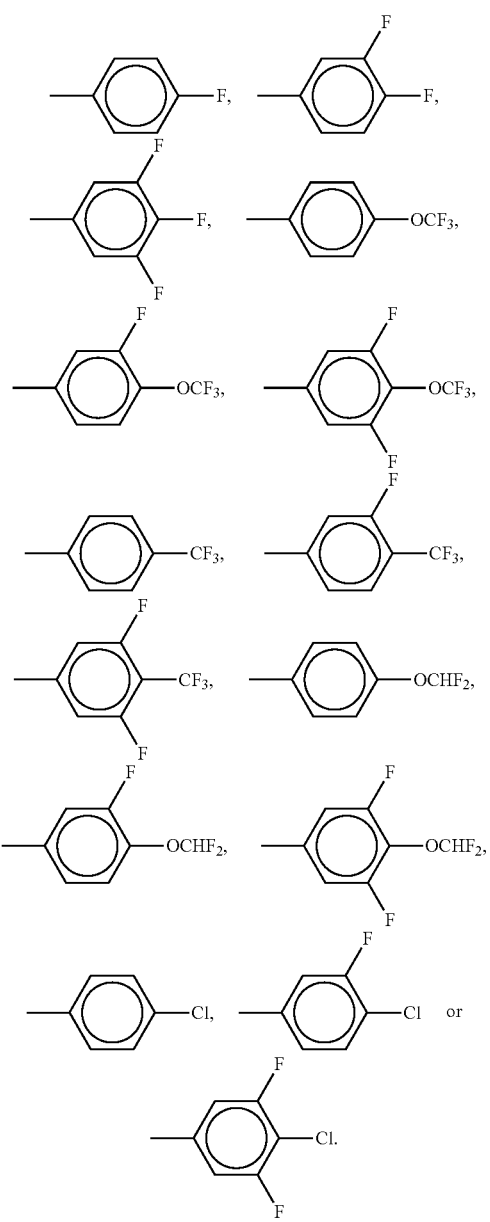

$R^0$ is preferably straight-chain alkyl or alkenyl having 2 to 7 C atoms;

$X^0$ is preferably F, furthermore $OCF_3$, Cl or $CF_3$;

the medium preferably comprises one, two or three compounds of the formula I;

the medium preferably comprises one or more compounds selected from the group of the compounds of the formulae I, II, III, VI-2, XI, XII, XIII, XIV, XXIV, XXVI;

the medium preferably comprises in each case one or more compounds of the formulae VI-2, VII-1a/b, IX, X, XI, XXV and XXVI;

the medium preferably comprises 1-25% by weight, preferably 1-20% by weight, of compounds of the formula I;

the proportion of compounds of the formulae II-XXVIII in the mixture as a whole is preferably 20 to 99% by weight;

the medium preferably comprises 25-80% by weight, particularly preferably 30-70% by weight, of compounds of the formulae II and/or III;

the medium preferably comprises 20-70% by weight, particularly preferably 25-60% by weight, of compounds of the formula IIa, in particular in which $R^{3a}$ denotes H;

the medium preferably comprises 2-20% by weight, particularly preferably 3-15% by weight, of compounds of the formula VI-2;

the medium comprises 2-20% by weight, particularly preferably 3-15% by weight, of compounds of the formula XI;

the medium preferably comprises 1-25% by weight, particularly preferably 2-20% by weight, of compounds of the formula XXVI.

It has been found that even a relatively small proportion of compounds of the formula I mixed with conventional liquid-crystal materials, but in particular with one or more compounds of the formulae II to XXVIII, results in a significant increase in the light stability and in low birefringence values, with broad nematic phases having low smectic-nematic transition temperatures being observed at the same time, improving the storage stability. The mixtures simultaneously exhibit very low threshold voltages and very good values for the VHR on exposure to UV.

The term "alkyl" or "alkyl*" in this application encompasses straight-chain and branched alkyl groups having 1-7 carbon atoms, in particular the straight-chain groups methyl, ethyl, propyl, butyl, pentyl, hexyl and heptyl. Groups having 1-6 carbon atoms are generally preferred.

The term "alkenyl" or "alkenyl*" in this application encompasses straight-chain and branched alkenyl groups having 2-7 carbon atoms, in particular the straight-chain groups. Preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" in this application encompasses straight-chain groups containing at least one fluorine atom, preferably a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxy" in this application encompasses straight-chain radicals of the formula $C_nH_{2n+1}$—O—$(CH_2)_m$, in which n and m each, independently of one another, denote 1 to 6. m may also denote 0. Preferably, n=1 and m=1-6 or m=0 and n=1-3.

If $R^0$ in the formulae above and below denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradecoxy.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

If $R^0$ denotes an alkyl radical in which a $CH_2$ group has been replaced by —CH=CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl. These radicals may also be mono- or polyhalogenated.

If $R^0$ denotes an alkyl or alkenyl radical which is at least monosubstituted by halogen, this radical is preferably straight-chain and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

In the formulae above and below, $X^0$ is preferably F, Cl or a mono- or polyfluorinated alkyl or alkoxy radical having 1, 2 or 3 C atoms or a mono- or polyfluorinated alkenyl radical having 2 or 3 C atoms. $X^0$ is particularly preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CH_2F$, $OCFHCF_2CF_3$, $OCFHCF_2CHF_2$, $OCH=CF_2$, $OCF=CF_2$, $OCF_2CHFCF_3$, $OCF_2CF_2CF_3$, $OCF_2CF_2CClF_2$, $OCClFCF_2CF_3$, $CF=CF_2$, $CF=CHF$ or $CH=CF_2$, very particularly preferably F or $OCF_3$.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}/k_{11}$ compared with alkyl and alkoxy radicals. The mixtures according to the invention are distinguished, in particular, by high $K_1$ values and thus have significantly faster response times than the mixtures from the prior art.

The optimum mixing ratio of the compounds of the above-mentioned formulae depends substantially on the desired properties, on the choice of the components of the above-mentioned formulae and on the choice of any further components that may be present.

Suitable mixing ratios within the range indicated above can easily be determined from case to case.

The total amount of compounds of the above-mentioned formulae in the mixtures according to the invention is not crucial. The mixtures can therefore comprise one or more further components for the purposes of optimisation of various properties. However, the observed effect on the desired improvement in the properties of the mixture is generally greater, the higher the total concentration of compounds of the above-mentioned formulae.

In a particularly preferred embodiment, the media according to the invention comprise compounds of the formulae IV to VIII in which $X^0$ denotes F, $OCF_3$, $OCHF_2$, $OCH=CF_2$, $OCF=CF_2$ or $OCF_2$—$CF_2H$. A favourable synergistic action with the compounds of the formula I results in particularly advantageous properties. In particular, mixtures comprising compounds of the formulae I, VI and XI are distinguished by their low threshold voltages.

The individual compounds of the above-mentioned formulae and the sub-formulae thereof which can be used in the media according to the invention are either known or can be prepared analogously to the known compounds.

The invention also relates to electro-optical displays, such as, for example, TN, STN, TFT, OCB, IPS, FFS or MLC displays, having two plane-parallel outer plates, which, together with a frame, form a cell, integrated non-linear elements for switching individual pixels on the outer plates, and a nematic liquid-crystal mixture having positive dielectric anisotropy and high specific resistance located in the cell, which contain media of this type, and to the use of these media for electro-optical purposes.

The liquid-crystal mixtures according to the invention enable a significant broadening of the available parameter latitude. The achievable combinations of clearing point, viscosity at low temperature, thermal and UV stability and high optical anisotropy are far superior to previous materials from the prior art.

The mixtures according to the invention are particularly suitable for mobile applications and high-Δn TFT applications, such as, for example, PDAs, notebooks, LCD TVs and monitors.

The liquid-crystal mixtures according to the invention, with retention of the nematic phase down to −20° C. and preferably down to −30° C., particularly preferably down to −40° C., and of the clearing point $\geq$70° C., preferably $\geq$75° C., simultaneously enable rotational viscosities $\gamma_1$ of $\leq$100 mPa·s, particularly preferably $\leq$70 mPa·s, to be achieved, enabling excellent MLC displays having fast response times to be obtained.

The dielectric anisotropy Δ∈ of the liquid-crystal mixtures according to the invention is preferably $\geq$+5, particularly preferably $\geq$+10. In addition, the mixtures are characterised by low operating voltages. The threshold voltage of the liquid-crystal mixtures according to the invention is preferably $\leq$1.5 V, in particular $\leq$1.2 V.

The birefringence Δn of the liquid-crystal mixtures according to the invention is preferably $\geq$0.10, particularly preferably $\geq$0.11.

The nematic phase range of the liquid-crystal mixtures according to the invention preferably has a width of at least 90°, in particular at least 100°. This range preferably extends at least from −25° C. to +70° C.

It goes without saying that, through a suitable choice of the components of the mixtures according to the invention, it is also possible for higher clearing points (for example above 100° C.) to be achieved at higher threshold voltages or lower clearing points to be achieved at lower threshold voltages with retention of the other advantageous properties. At viscosities correspondingly increased only slightly, it is likewise possible to obtain mixtures having higher Δ∈ and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German patent 30 22 818), lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR on UV exposure than analogous mixtures comprising cyanophenylcyclohexanes of the formula

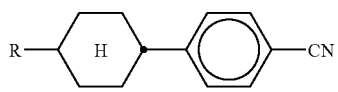

or esters of the formula

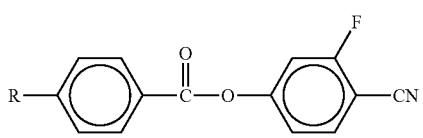

instead of the compounds of the formula I.

The light stability and UV stability of the mixtures according to the invention are considerably better, i.e. they exhibit a significantly smaller decrease in the HR on exposure to light or UV. Even low concentrations of the compounds (<10% by weight) of the formula I in the mixtures increase the HR by 6% or more compared with mixtures from the prior art.

The LC media may also comprise further additives known to the person skilled in the art and described in the literature, such as, for example, UV stabilisers, such as Tinuvin® from Ciba, antioxidants, free-radical scavengers, nanoparticles, etc. For example, 0-15% of pleochroic dyes or chiral dopants can be added. Suitable stabilisers and dopants are mentioned below in Tables C and D.

The individual components of the above-mentioned preferred embodiments of the LC media according to the invention are either known or their preparation methods can readily be derived from the prior art by the person skilled in the relevant art since they are based on standard methods described in the literature.

It goes without saying to the person skilled in the art that the LC media according to the invention may also comprise compounds in which, for example, H, N, O, Cl, F have been replaced by the corresponding isotopes.

The liquid-crystal mixtures which can be used in accordance with the invention are prepared in a manner conventional per se, for example by mixing one or more compounds of the formula I with one or more compounds of the formulae II-XXVIII or with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

The construction of the MLC display according to the invention from polarisers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the liquid-crystal parameters of the liquid-crystal layer.

The following examples explain the present invention without limiting it. However, they show the person skilled in the art preferred mixture concepts with compounds preferably to be employed and the respective concentrations thereof and combinations thereof with one another. In addition, the examples illustrate which properties and property combinations are accessible.

In the present application and in the examples below, the structures of the liquid-crystal compounds are indicated by means of acronyms, with the transformation into chemical formulae taking place in accordance with Tables A and B below. All radicals $C_nH_{2n+1}$ and $C_mH_{2m+1}$ are straight-chain alkyl radicals having n and m C atoms respectively; n, m and k are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nOCF3 | $C_nH_{2n+1}$ | $OCF_3$ | H | H |
| nOCF3.F | $C_nH_{2n+1}$ | $OCF_3$ | F | H |
| n-Vm | $C_nH_{2n+1}$ | $—CH=CH—C_mH_{2m+1}$ | H | H |
| nV-Vm | $C_nH_{2n+1}—CH=CH—$ | $—CH=CH—C_mH_{2m+1}$ | H | H |

Preferred mixture components are found in Tables A and B.

TABLE A

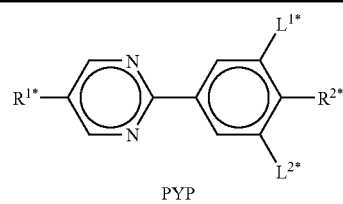

PYP

TABLE A-continued
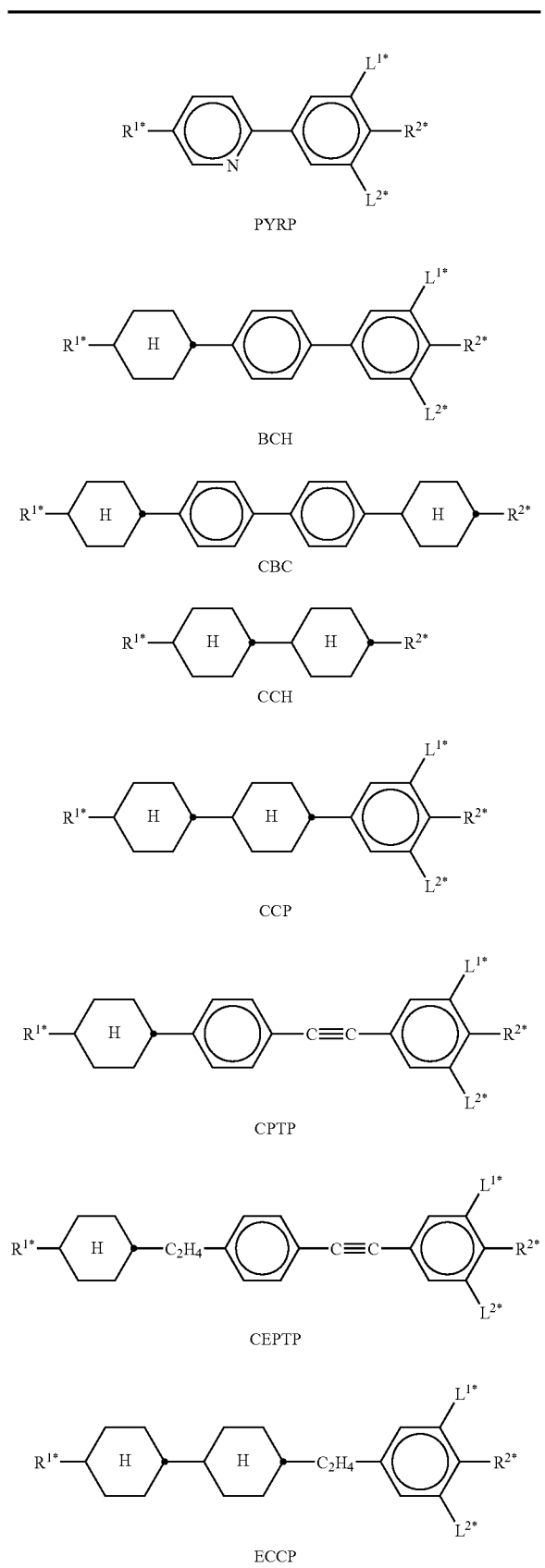
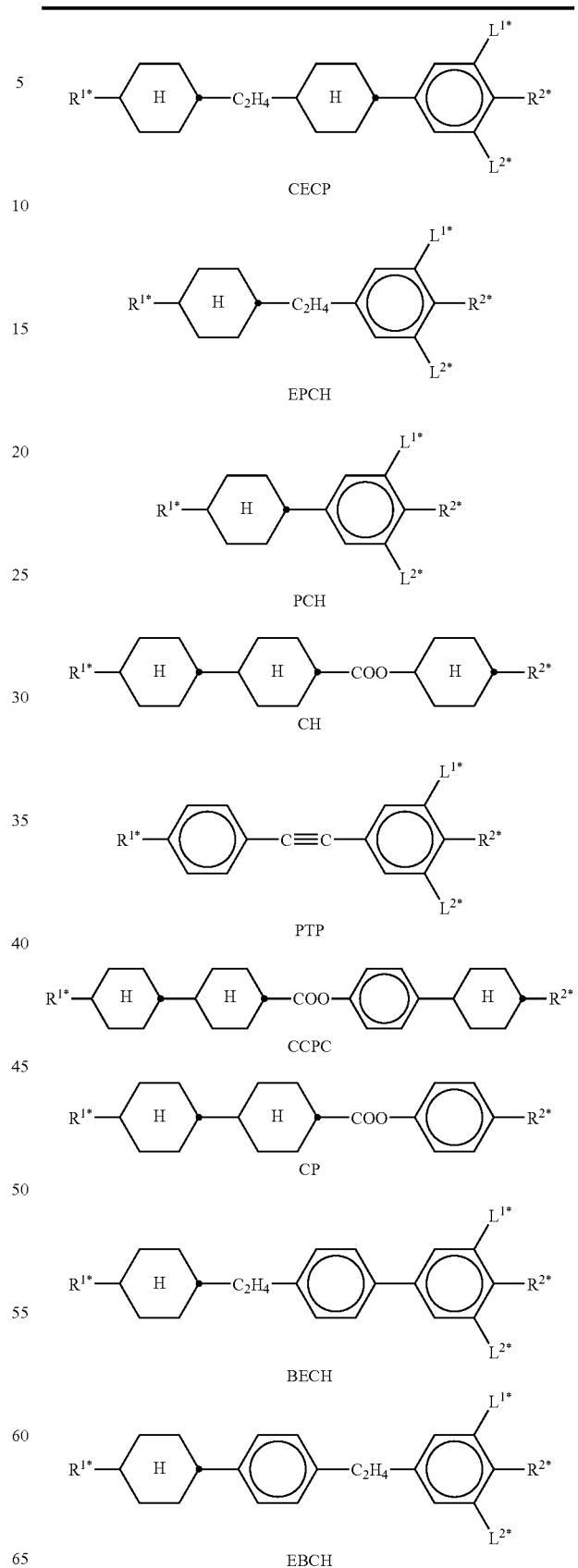

TABLE A-continued
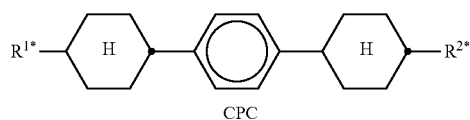
CPC
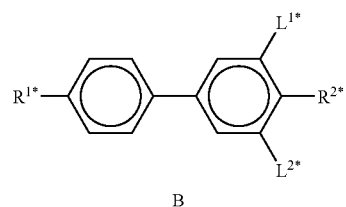
B
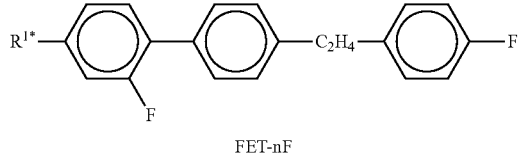
FET-nF
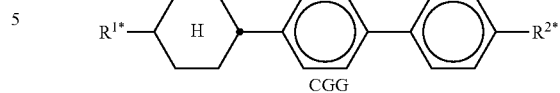
CGG
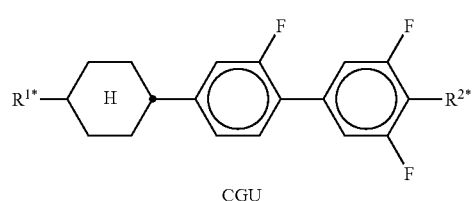
CGU
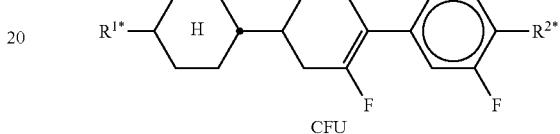
CFU
TABLE B
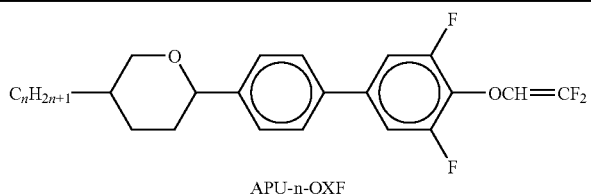
APU-n-OXF
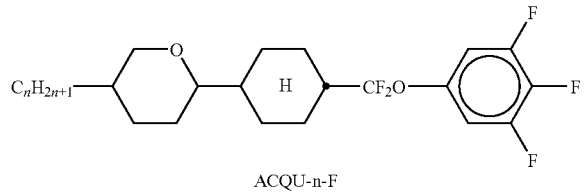
ACQU-n-F
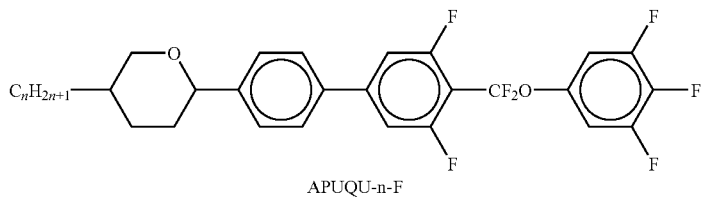
APUQU-n-F
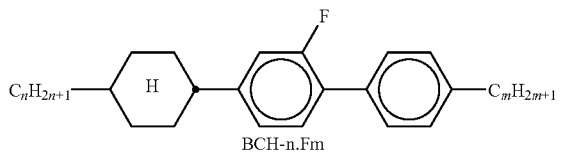
BCH-n.Fm
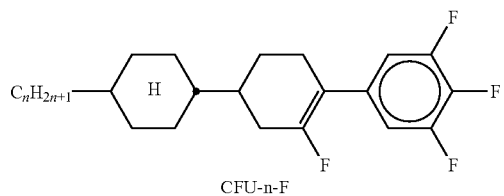
CFU-n-F TABLE B-continued
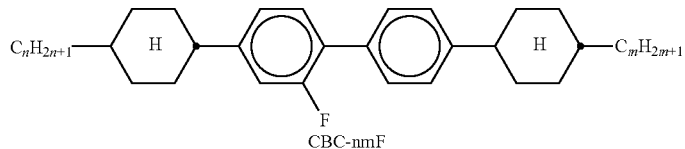
CBC-nmF
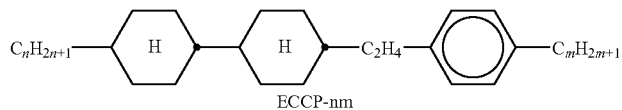
ECCP-nm
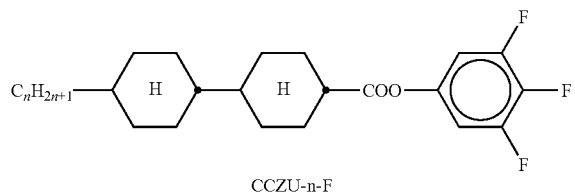
CCZU-n-F
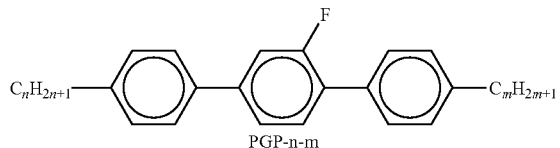
PGP-n-m
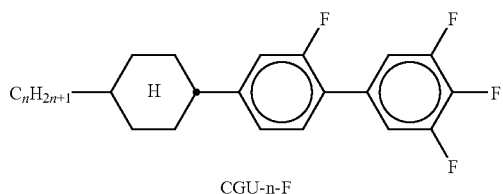
CGU-n-F
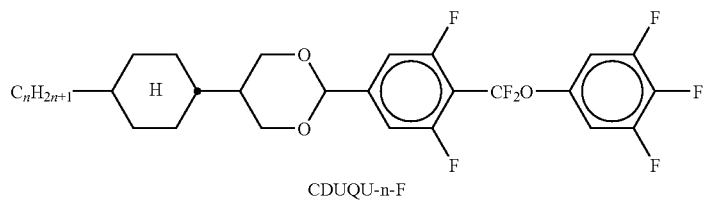
CDUQU-n-F
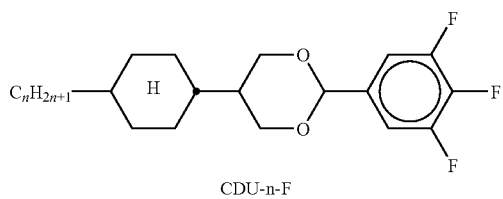
CDU-n-F
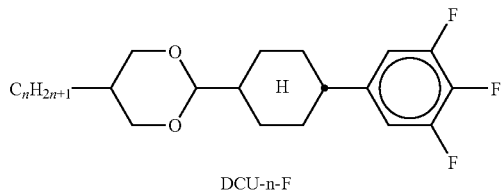
DCU-n-F
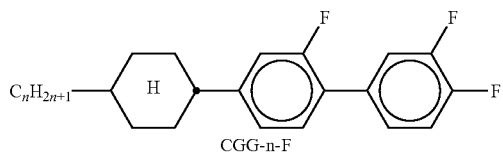
CGG-n-F TABLE B-continued
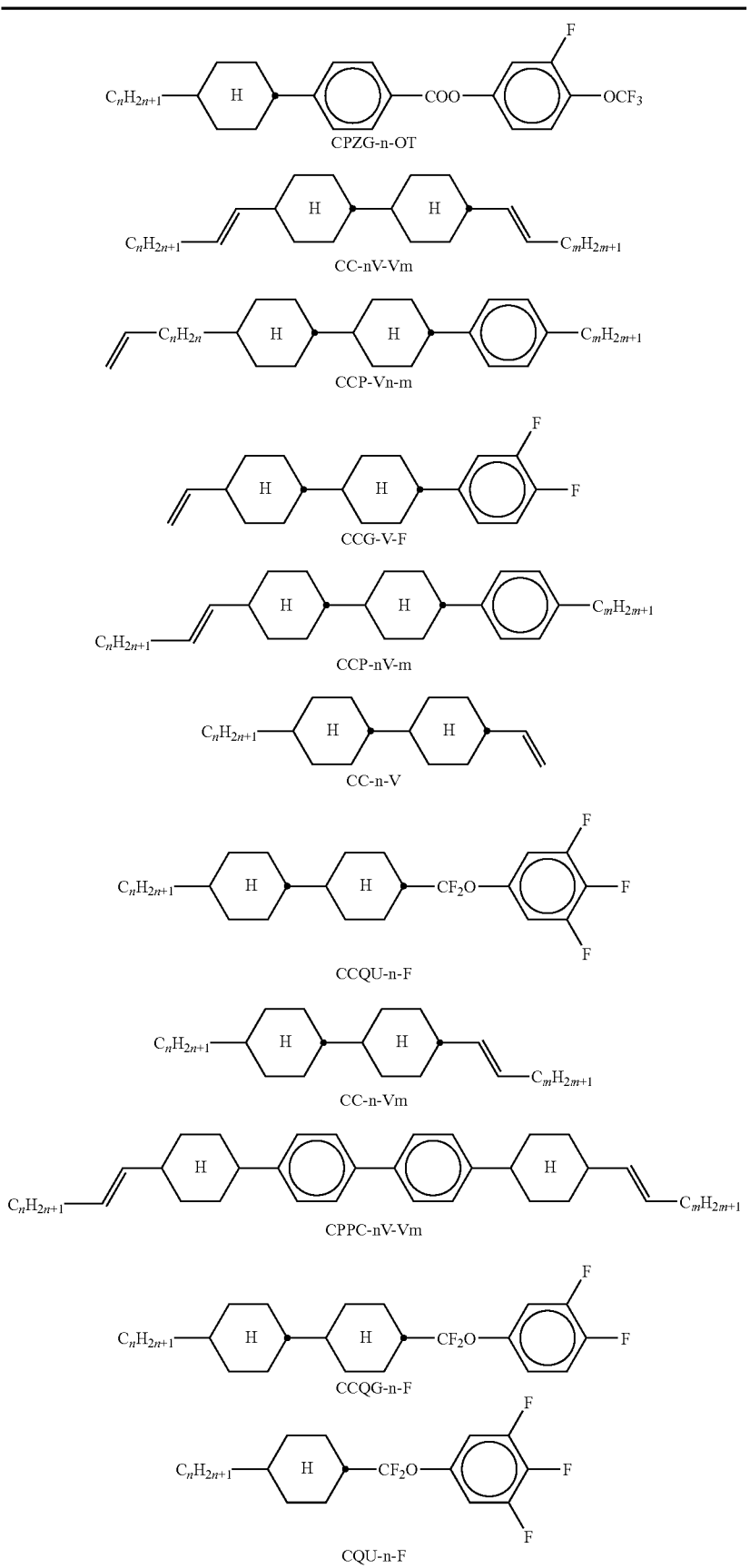

TABLE B-continued
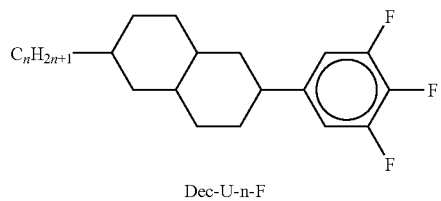
Dec-U-n-F
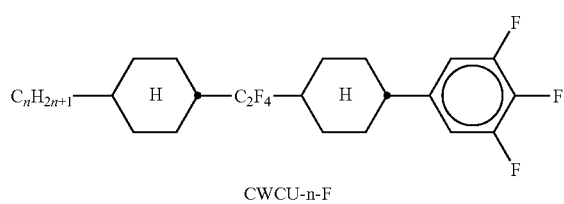
CWCU-n-F
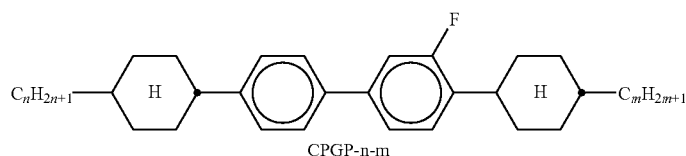
CPGP-n-m
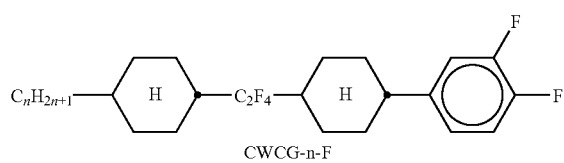
CWCG-n-F
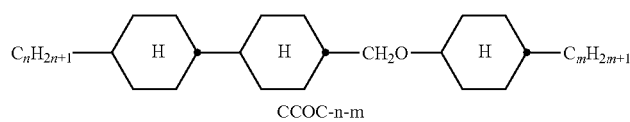
CCOC-n-m
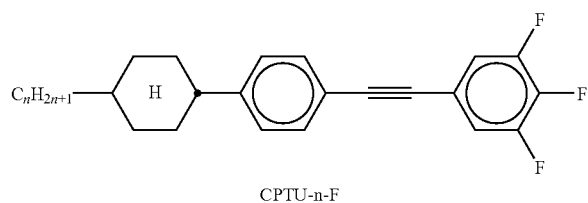
CPTU-n-F
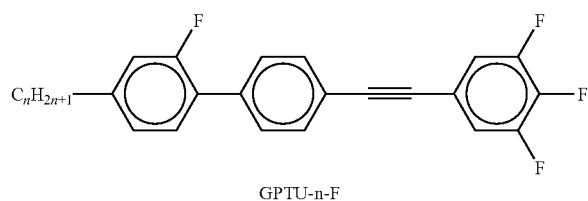
GPTU-n-F
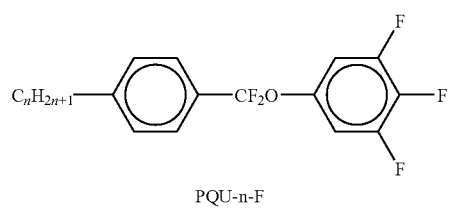
PQU-n-F TABLE B-continued
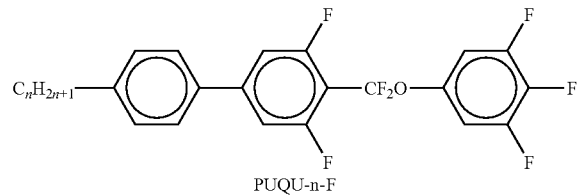
PUQU-n-F
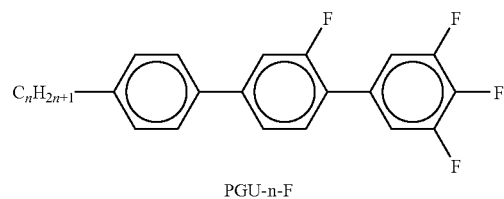
PGU-n-F
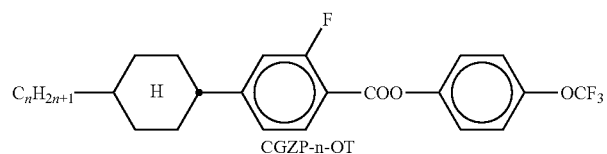
CGZP-n-OT
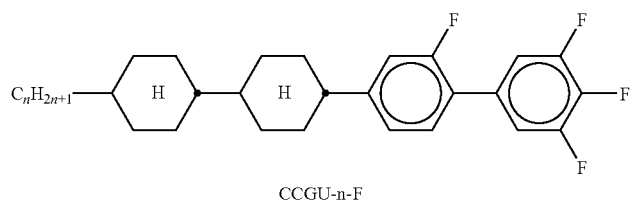
CCGU-n-F
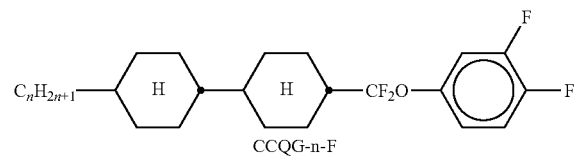
CCQG-n-F
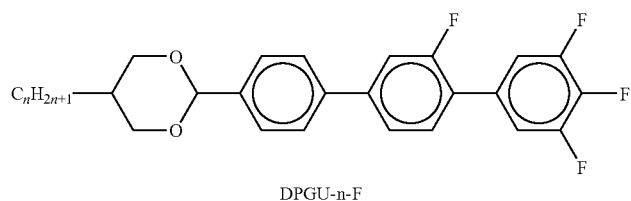
DPGU-n-F
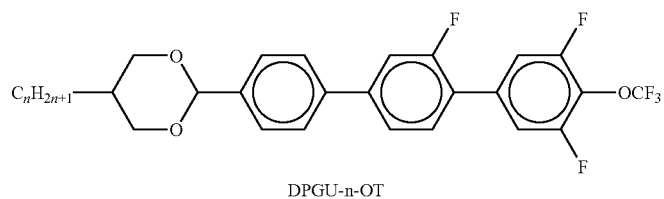
DPGU-n-OT
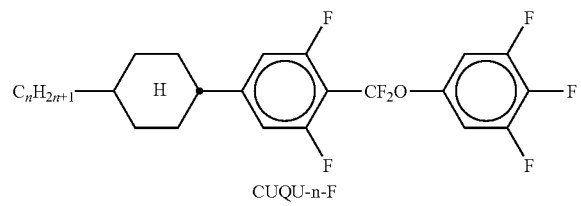
CUQU-n-F TABLE B-continued
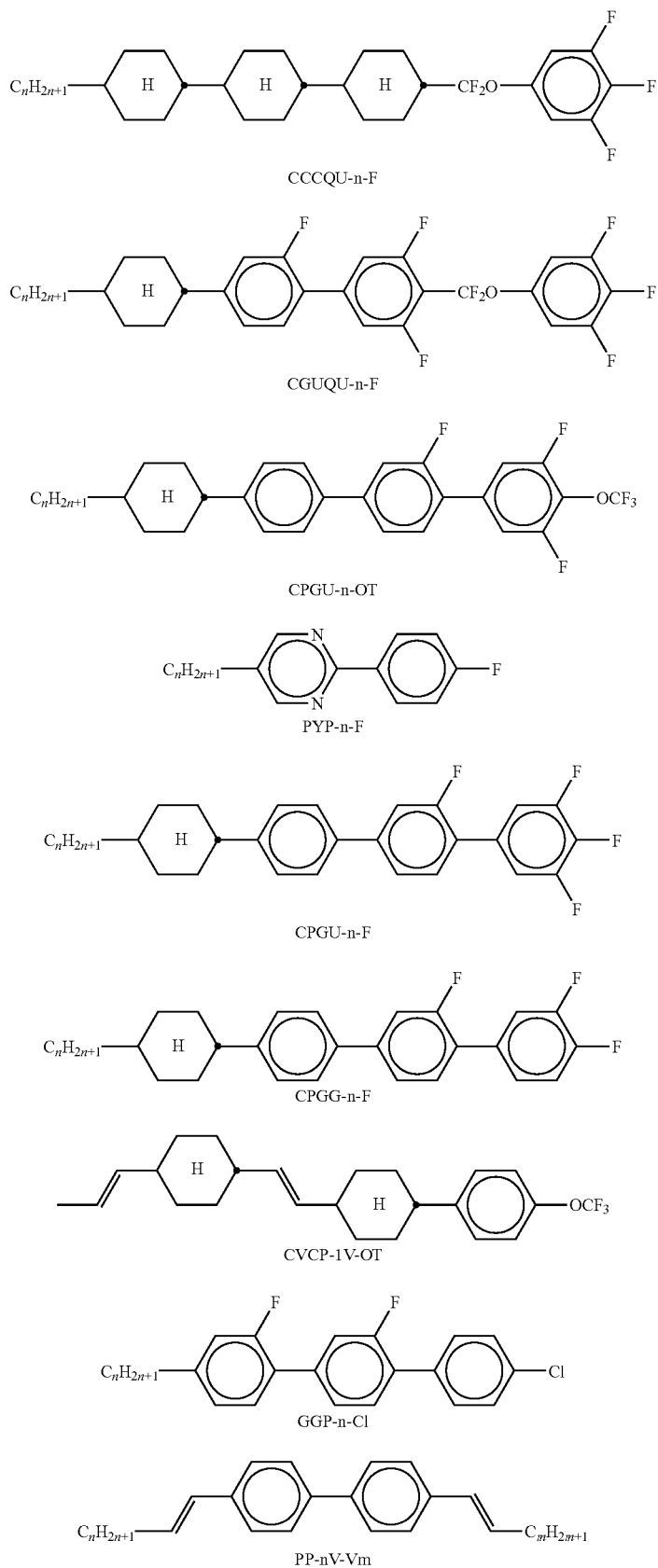

TABLE B-continued
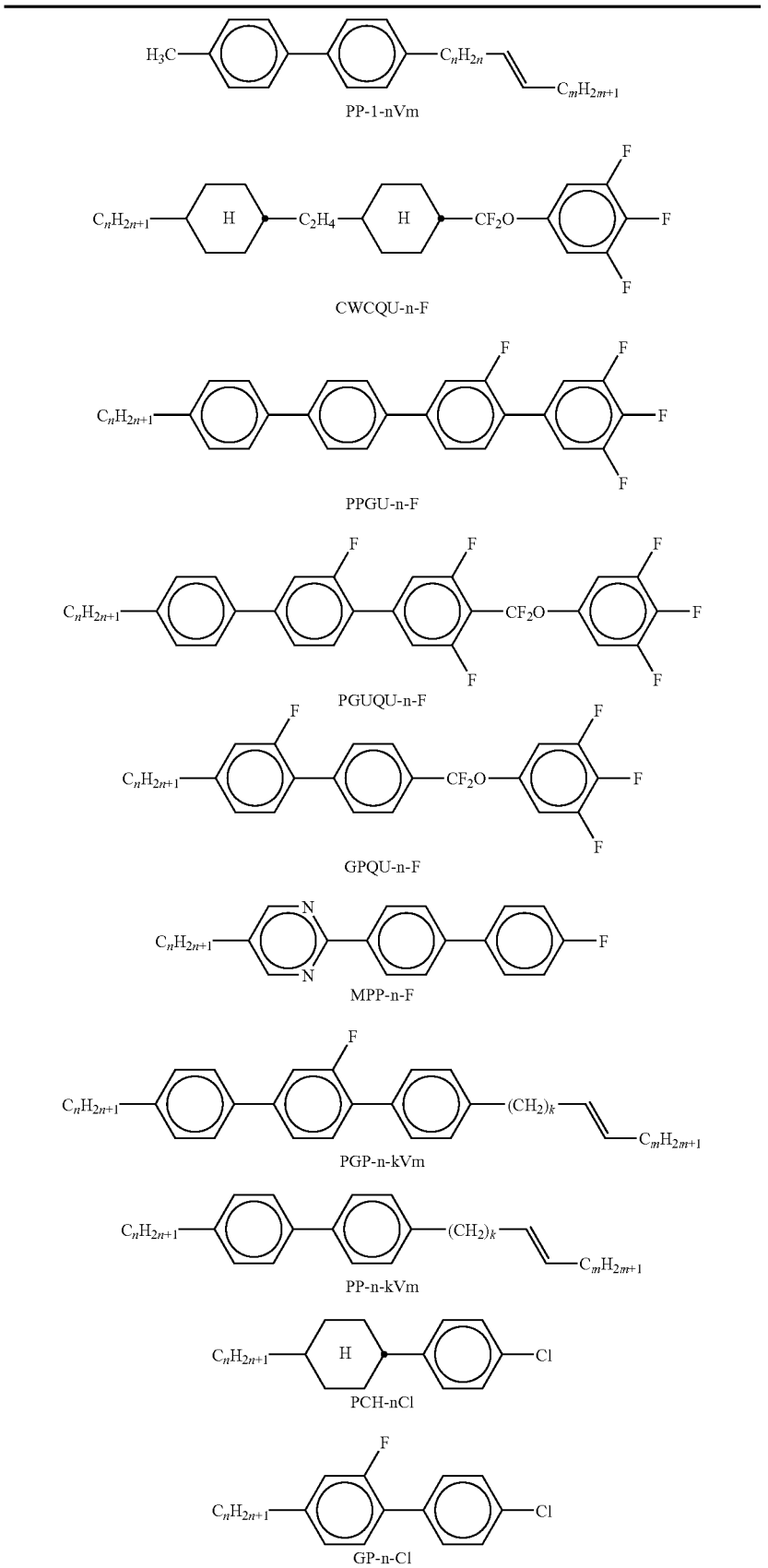

TABLE B-continued
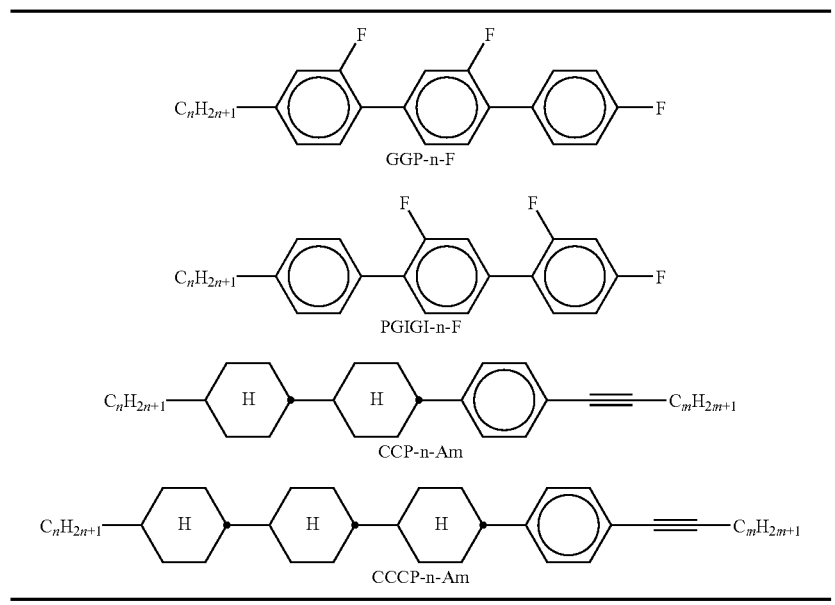
In a preferred embodiment of the present invention, the LC media according to the invention comprise one or more compounds selected from the group consisting of compounds from Tables A and B.
TABLE C
Table C indicates possible dopants which can be added to the LC media according to the invention.
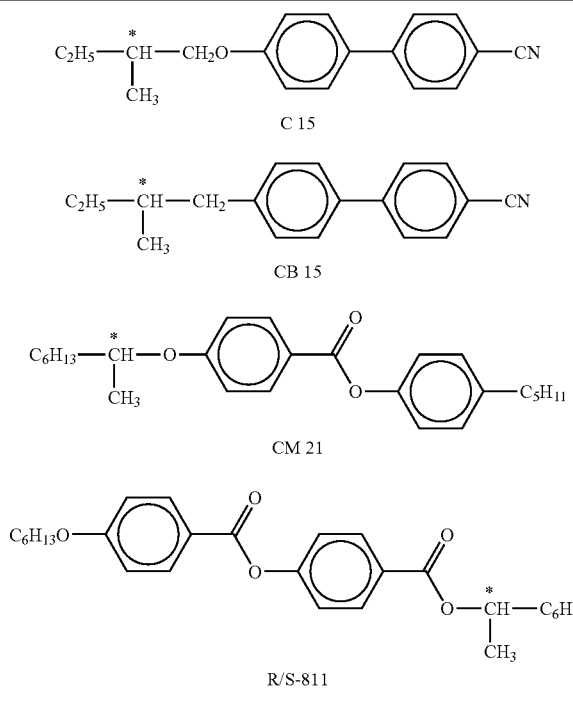

TABLE C-continued
Table C indicates possible dopants which can be added to the LC media according to the invention.
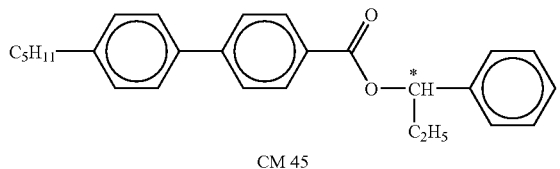
CM 45
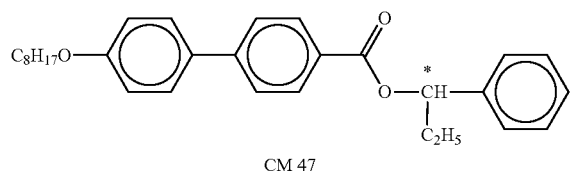
CM 47
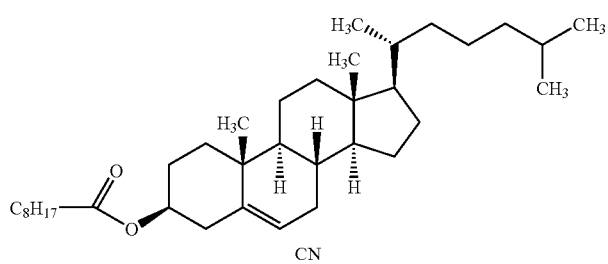
CN
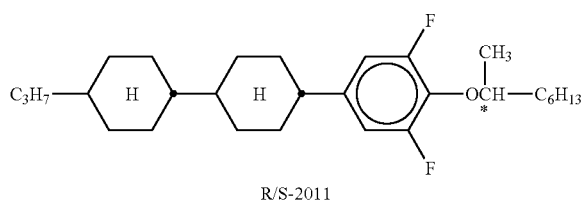
R/S-2011
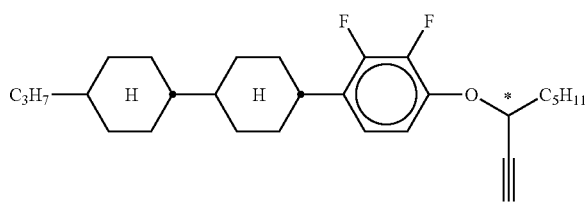
R/S-3011
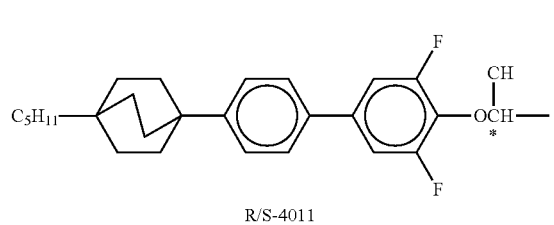
R/S-4011
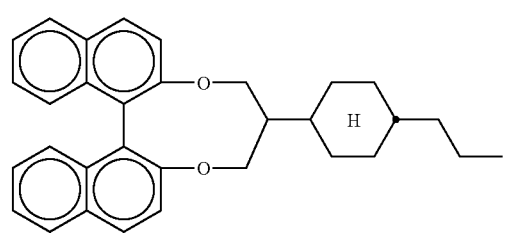
R/S-5011

TABLE C-continued

Table C indicates possible dopants which can be added to the LC media according to the invention.

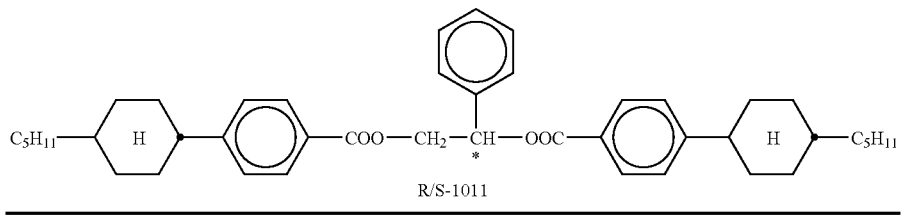

R/S-1011

The LC media preferably comprise 0 to 10% by weight, in particular 0.01 to 5% by weight and particularly preferably 0.1 to 3% by weight, of dopants. The LC media preferably comprise one or more dopants selected from the group consisting of compounds from Table C.

TABLE D

Table D indicates possible stabilisers which can be added to the LC media according to the invention.

(n here denotes an integer from 1 to 12)

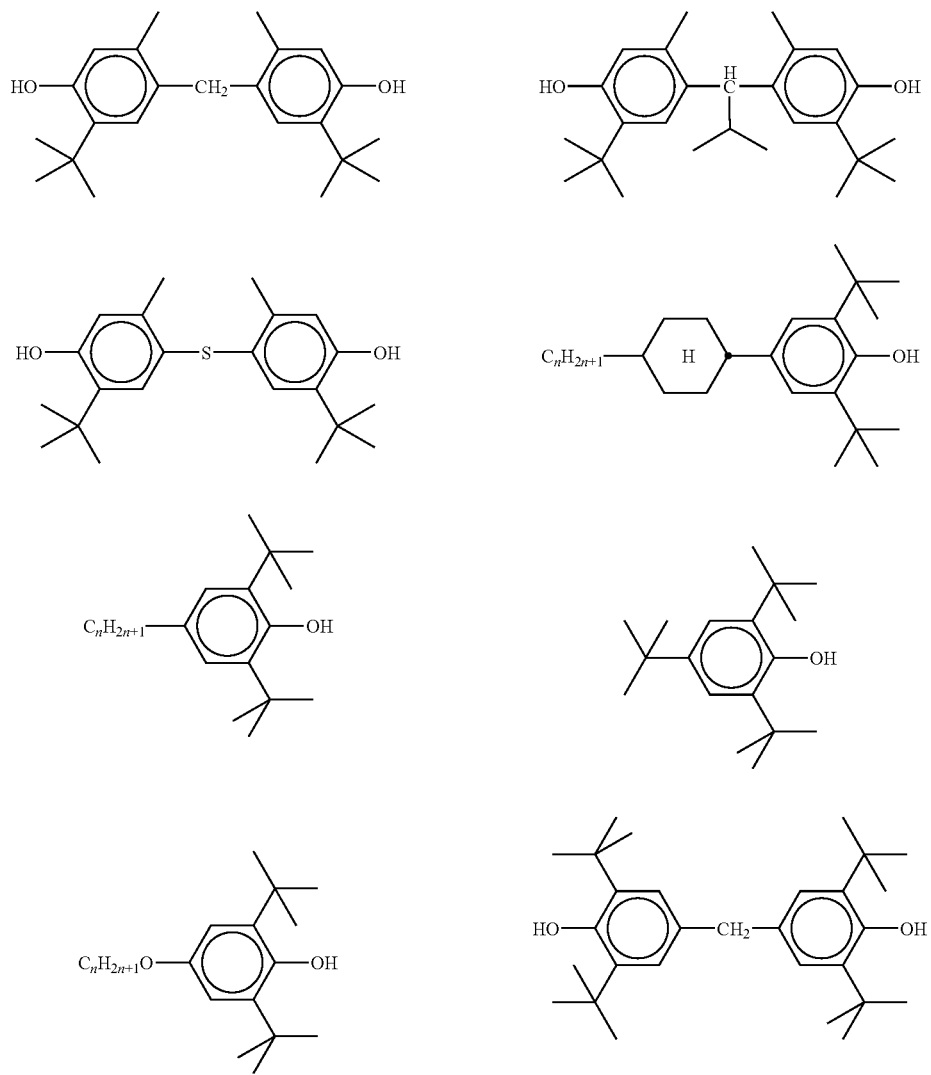

TABLE D-continued
Table D indicates possible stabilisers which can be added to the LC media according to the invention.
(n here denotes an integer from 1 to 12)
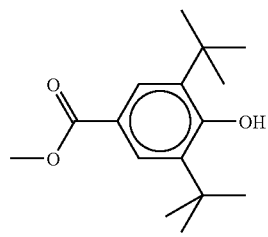
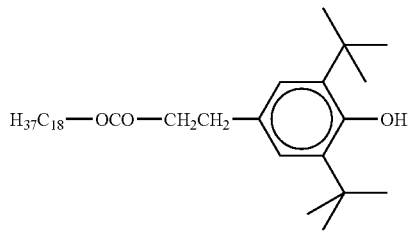
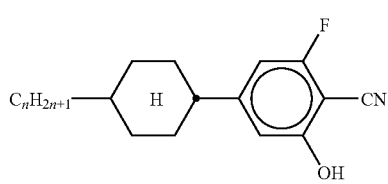
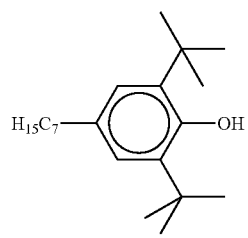
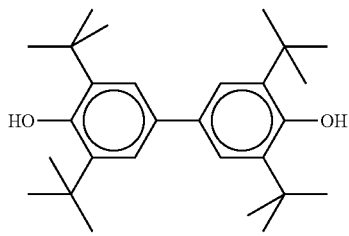
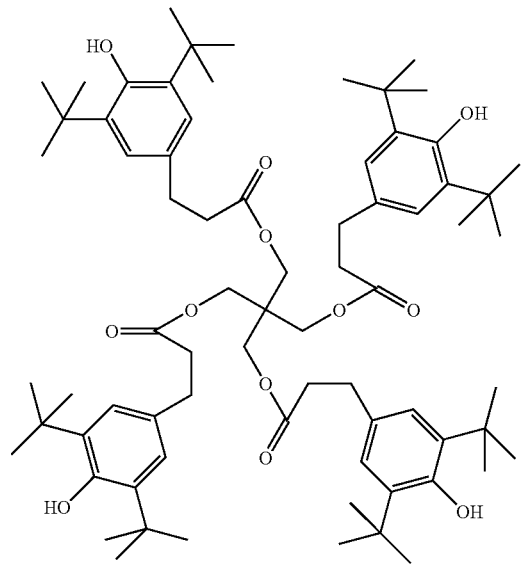
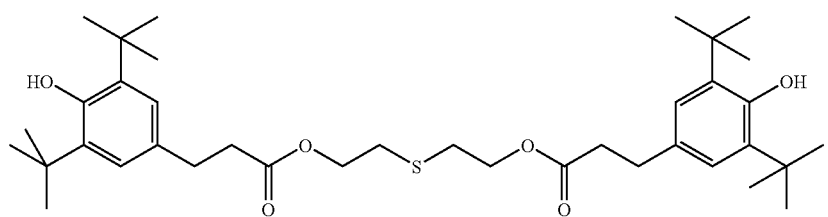

TABLE D-continued
Table D indicates possible stabilisers which can be added to the LC media according to the invention.
(n here denotes an integer from 1 to 12)
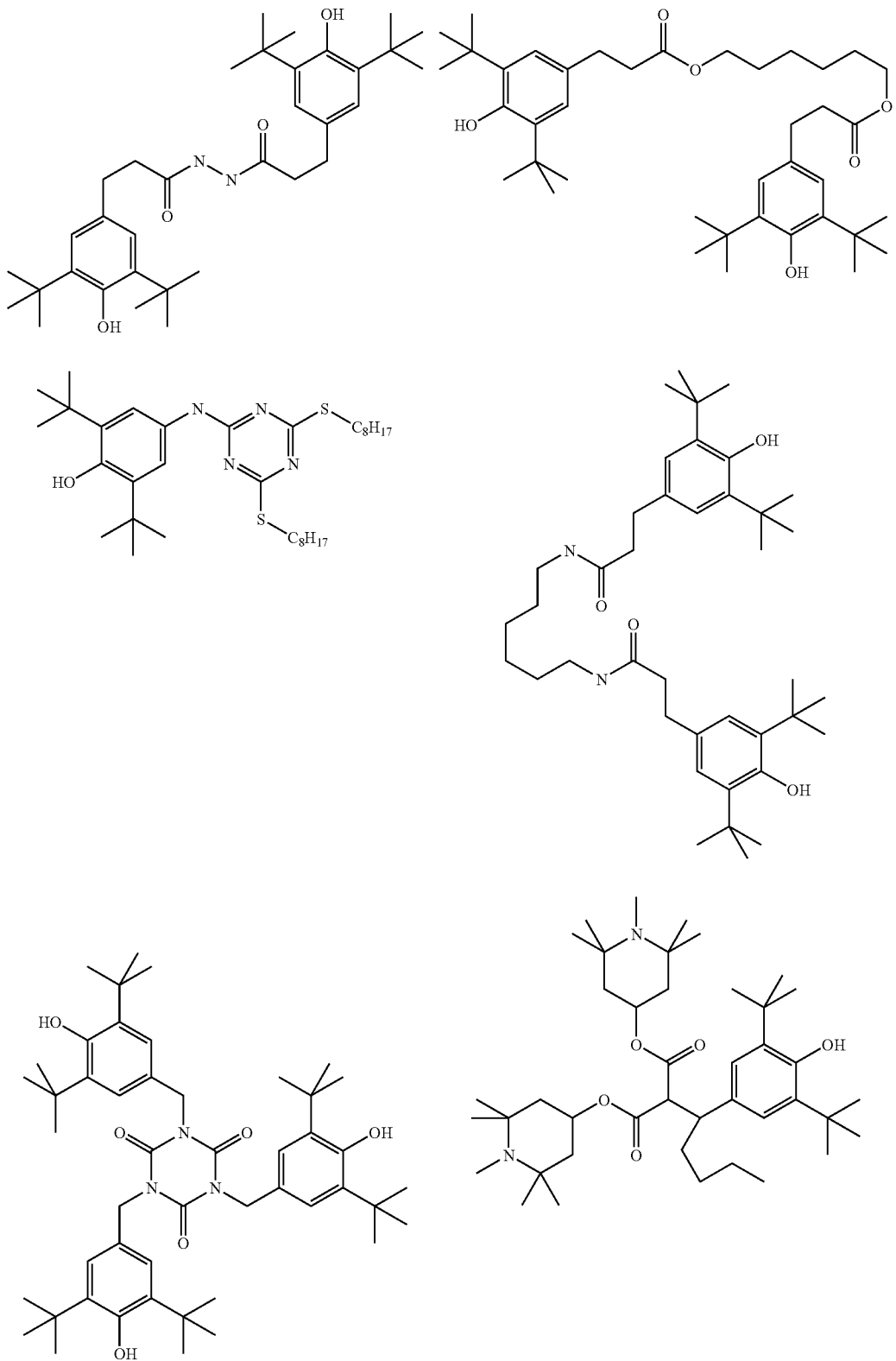

TABLE D-continued
Table D indicates possible stabilisers which can be added to the LC media according to the invention.
(n here denotes an integer from 1 to 12)
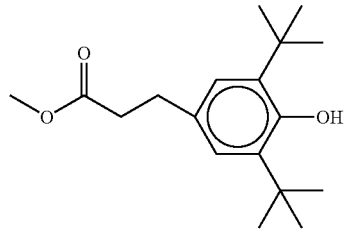 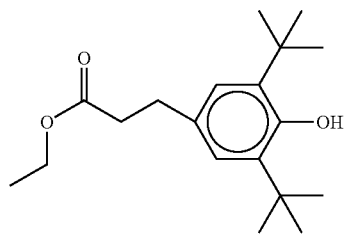
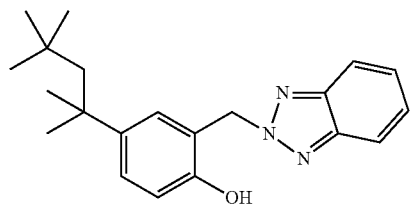 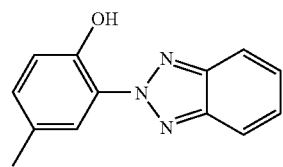
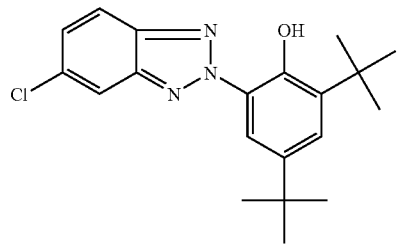 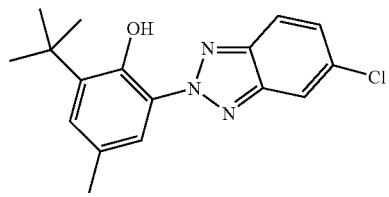
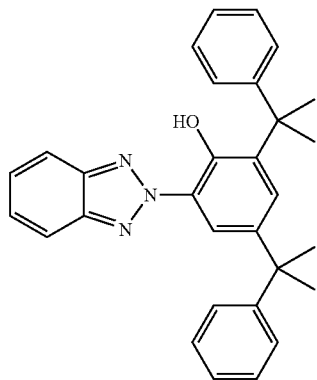 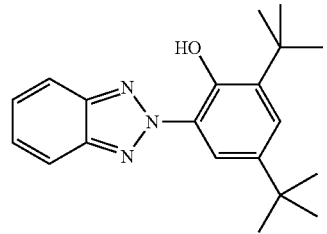
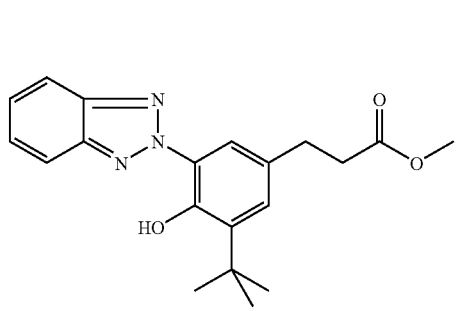 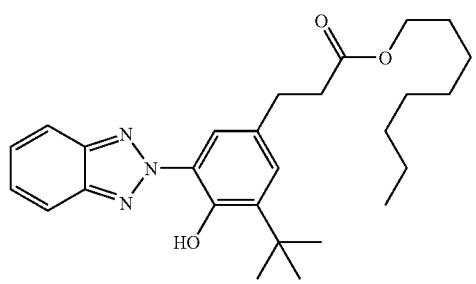

TABLE D-continued

Table D indicates possible stabilisers which can be added to the LC media according to the invention.
(n here denotes an integer from 1 to 12)

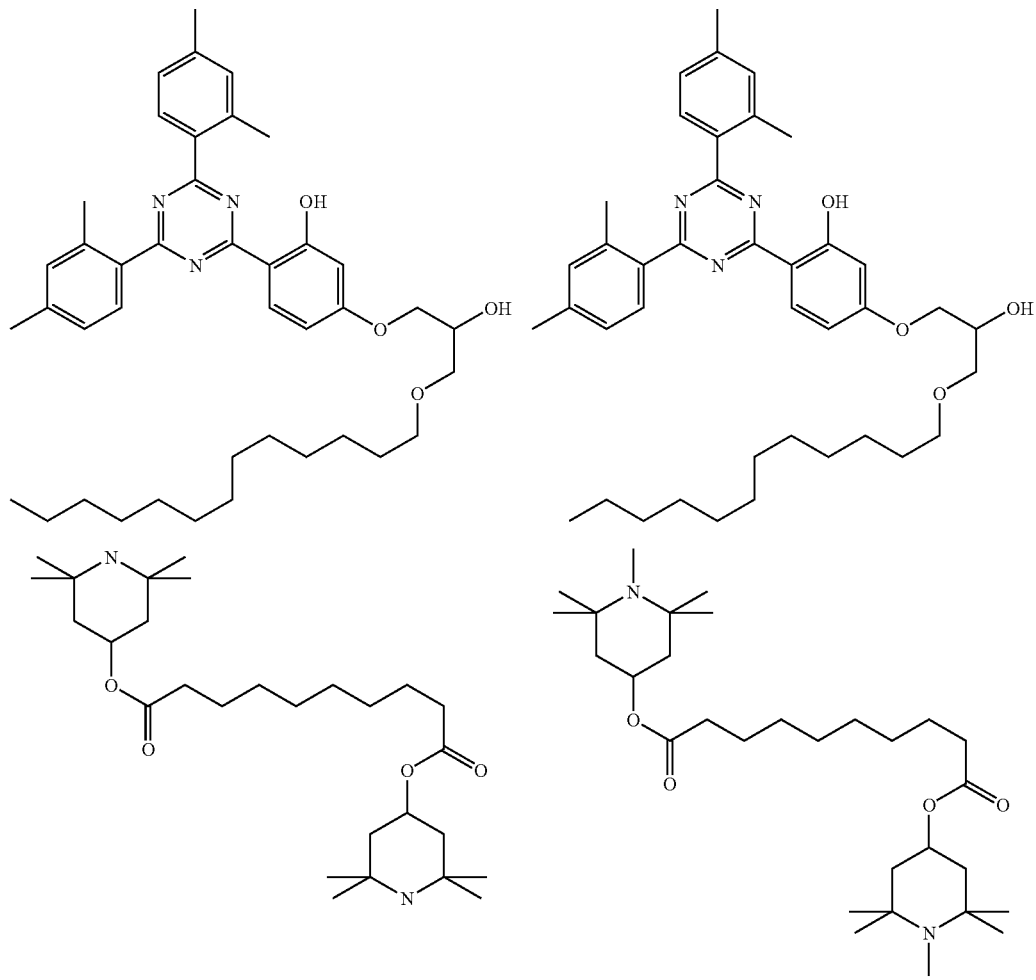

The LC media preferably comprise 0 to 10% by weight, in particular 0.01 to 5% by weight and particularly preferably 0.1 to 3% by weight, of stabilisers. The LC media preferably comprise one or more stabilisers selected from the group consisting of compounds from Table D.

In addition, the following abbreviations and symbols are used:

| | |
|---|---|
| $V_0$ | threshold voltage, capacitive [V] at 20° C., |
| $V_{10}$ | optical threshold for 10% relative contrast [V] at 20° C., |
| $n_e$ | extraordinary refractive index at 20° C. and 589 nm, |
| $n_o$ | ordinary refractive index at 20° C. and 589 nm, |
| $\Delta n$ | optical anisotropy at 20° C. and 589 nm, |
| $\epsilon_\perp$ | dielectric susceptibility perpendicular to the director at 20° C. and 1 kHz, |
| $\epsilon_\parallel$ | dielectric susceptibility parallel to the director at 20° C. and 1 kHz, |
| $\Delta\epsilon$ | dielectric anisotropy at 20° C. and 1 kHz, |
| cl.p., T(N, I) | clearing point [° C.], |
| $\gamma_1$ | rotational viscosity at 20° C. [mPa·s], |
| $K_1$ | elastic constant, "splay" deformation at 20° C. [pN], |
| $K_2$ | elastic constant, "twist" deformation at 20° C. [pN], |
| $K_3$ | elastic constant, "bend" deformation at 20° C. [pN], |
| LTS | low-temperature stability (phase), determined in test cells, |

-continued

| | |
|---|---|
| $HR_{20}$ | voltage holding ratio at 20° C. [%] and |
| $HR_{100}$ | voltage holding ratio at 100° C. [%]. |

Unless explicitly noted otherwise, all concentrations in the present application are indicated in percent by weight and relate to the corresponding mixture as a whole without solvents.

Unless explicitly noted otherwise, all temperature values indicated in the present application, such as, for example, the melting point T(C,N), the transition from the smectic (S) to the nematic (N) phase T(S,N) and the clearing point T(N,I), are indicated in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Darmstadt, Germany, and apply to a temperature of 2° C., and $\Delta n$ is determined at 589 nm and $\Delta\epsilon$ at 1 kHz, unless explicitly indicated otherwise in each case.

The liquid-crystalline properties of the individual compounds are, unless indicated otherwise, determined in the nematic host mixture ZLI-4792 (commercially available from Merck KGaA, Darmstadt) at a concentration of 10%.

"Room temperature" means 20° C., unless indicated otherwise.

The term "threshold voltage" for the present invention relates to the capacitive threshold ($V_0$), also called the Freedericks threshold, unless explicitly indicated otherwise. In the examples, as generally usual, the optical threshold for 10% relative contrast ($V_{10}$) may also be indicated.

The test cells used for measurement of the capacitive threshold voltage $V_0$ and for $V_{10}$ are constructed from substrates consisting of soda-lime glass coated with polyimide alignment layers (Durimid 32 with diluent (70% of NMP+ 30% of xylene) in the ratio 1:4) from Arch Chemicals, which are rubbed antiparallel to one another and have a surface tilt of quasi 0 degrees. The area of the transparent, virtually square ITO electrodes is 1 cm². The capacitive threshold voltage is determined using a standard commercial high-resolution LCR meter (for example Hewlett Packard 4284A LCR meter).

EXAMPLE 1

4'-(4-Pent-1-ynylphenyl)-4-propylbicyclohexyl

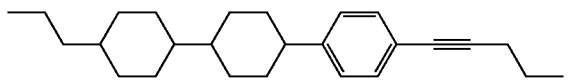

The compound 4'-(4-pent-1-ynylphenyl)-4-propylbicyclohexyl according to the invention is prepared as described below:

Synthesis of 4-(4-bromophenyl)-4'-propylbicyclohexyl-4-ol

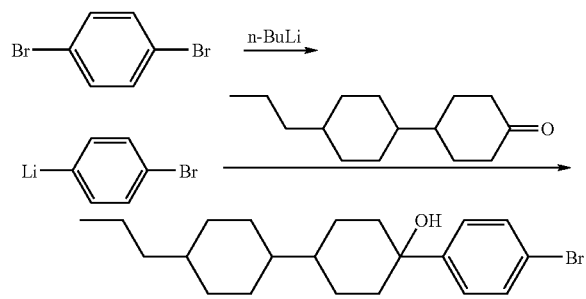

106 g (0.45 mol) of 1,4-dibromobenzene are initially introduced in 400 ml of Et$_2$O at −45° C., and 275 ml (0.45 mol) of n-BuLi (15% soln. in hexane) are metered in. After 30 min at this temperature, a solution of 100 g (0.45 mol) of 4'-propylbicyclohexyl-4-one in 200 ml of Et$_2$O is added dropwise, and the mixture is warmed to 0° C. After 1 h, water and dil. hydrochloric acid are added to the batch, and the organic phase is separated off. The aqueous phase is extracted with MTBE, and the combined organic phases are washed with water and subsequently dried using sodium sulfate. The solution is concentrated to completion, and the residue is used without further purification for the following reaction.

Synthesis of 4-(4-bromophenyl)-4'-propylbicyclohexyl-3-ene

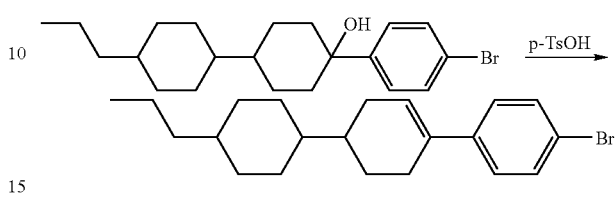

184 g (about 0.45 mol) of crude 4-(4-bromophenyl)-4'-propylbicyclohexyl-4-ol are heated on a water separator together with 5.6 g (29.2 mmol) of p-toluenesulfonic acid monohydrate in 900 ml of toluene. The solution is washed a number of times with water and dried using sodium sulfate. The crude product remaining after removal of the solvent is recrystallised from ethyl acetate at −20° C. This gives 4-(4-bromophenyl)-4'-propylbicyclohexyl-3-ene as a slightly yellow solid.

Synthesis of 4'-(4-bromophenyl)-4-propylbicyclohexyl

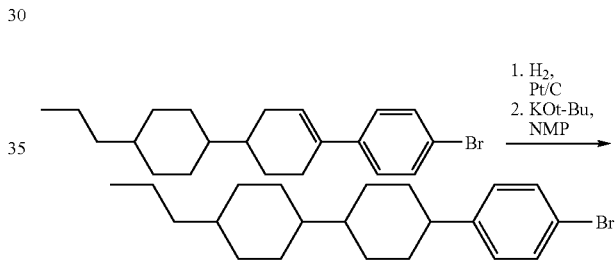

86 g (0.24 mol) of 4-(4-bromophenyl)-4'-propylbicyclohexyl-3-ene are hydrogenated in 5 l of n-heptane in the presence of Pt/C (5% of Pt) at room temperature and a hydrogen pressure of 1 bar. The reaction solution is concentrated by half and filtered absorptively through silica gel (SiO$_2$). The filtrate is concentrated to completion.

The residue is taken up in 200 ml of NMP, and 13.4 g (0.12 mol) of potassium tert-butoxide are added. The mixture is warmed at 60° C. for 48 h. After cooling, the batch is added to ice and acidified using dil. hydrochloric acid. The mixture is extracted a number of times with pentane, and the combined organic phases are washed with water. The solution is dried using sodium sulfate and concentrated to completion. The crude product is recrystallised from isopropanol. This gives 4'-(4-bromophenyl)-4-propylbicyclohexyl as a beige solid.

Synthesis of 4'-(4-pent-1-ynylphenyl)-4-propylbicyclohexyl

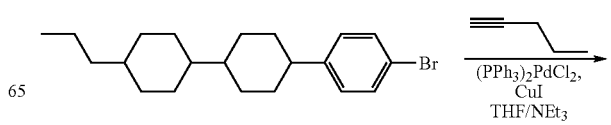

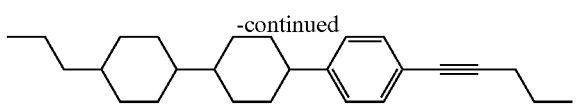

8.0 g (22.0 mmol) of 4'-(4-bromophenyl)-4-propylbicyclohexyl are stirred at 60° C. for 60 h in 80 ml of NEt₃ together with 4.4 ml (44.0 mmol) of 1-pentyne in the presence of 309 mg (0.44 mmol) of bis(triphenylphosphine)palladium(II) chloride and 42 mg (0.22 mmol) of copper(I) iodide. The batch is added to ice-water and acidified using hydrochloric acid. The mixture is extracted with MTBE, and the combined organic phases are washed with water and sat. sodium chloride solution. The solution is concentrated to completion, and the crude product is purified by column chromatography (SiO₂, n-heptane). The further purification is carried out by recrystallisation from n-heptane (−20° C.). This gives 4'-(4-pent-1-ynylphenyl)-4-propylbicyclohexyl as a colourless solid (m.p. 47° C.).

¹H-NMR (300 MHz, CHCl₃): δ=7.30 (d, 2H, J=8.4 Hz, $H_{arom.}$), 7.10 (d, 2H, J=8.4 Hz, $H_{arom.}$), 2.46-2.33 (m, 3H, $H_{benzyl}$, $H_{propargyl}$), 1.93-1.69 (m, 8H, $H_{aliph.}$), 1.76-1.55 (m, 2H, $H_{aliph.}$), 1.47-1.23 (m, 4H, $H_{aliph.}$), 1.21-0.98 (m, 12H, $H_{aliph.}$), 0.95-0.80 (m, 5H, $H_{aliph.}$).

MS (EI): m/e (%)=350 (100, M⁺).

Δ∈=+2.3

Δn=0.1620

$\gamma_1$=782 mPa·s

C 47 SmB 154 SmA 160 N 211 I

The compound 4'-(4-pent-1-ynylphenyl)-4-propylbicyclohexyl according to the invention can also be prepared by the Kumada-Corriu reaction [L.-M-Yang, L.-F. Huang, T.-Y. Luh, *Org. Lett.* 2004, 6, 1461-1463] of 4'-(4-ethynylphenyl)-4-propylbicyclohexyl (synthesis see Example 2) with propyl iodide.

EXAMPLE 2

4'-(4-Ethynylphenyl)-4-propylbicyclohexyl

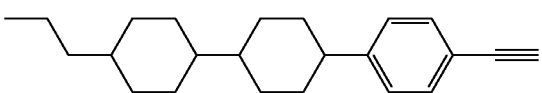

The compound 4'-(4-ethynylphenyl)-4-propylbicyclohexyl according to the invention is prepared as described below:

Synthesis of trimethyl-[4-(4'-propylbicyclohexyl-4-yl)phenylethynyl]silane

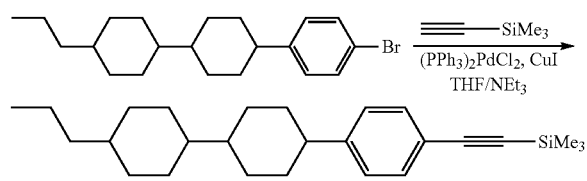

20.0 g (55.0 mmol) of 4'-(4-bromophenyl)-4-propylbicyclohexyl are dissolved in 200 ml of NEt₃ and stirred at 65° C. for 24 h together with 23.3 ml (0.17 mol) of trimethylacetylene in the presence of 1.55 g (2.20 mmol) of bis(triphenylphosphine)palladium(II) chloride and 0.84 g (4.40 mmol) of copper(I) iodide. A further 24 ml (0.17 mol) of trimethylacetylene, 1.6 g (2.2 mmol) of bis(triphenylphosphine)palladium(II) chloride and 0.8 g (4.4 mmol) of copper (I) iodide are subsequently metered in, and the batch is warmed at 65° C. for 48 h. After cooling, the reaction batch is added to ice-water and acidified using dil. hydrochloric acid. The mixture is extracted with MTBE, and the combined organic phases are washed with water and sat. sodium chloride solution. The solution is concentrated to completion, and the crude product is purified by column chromatography (SiO₂, n-heptane). This gives trimethyl-[4-(4'-propylbicyclohexyl-4-yl)phenylethynyl]silane as a yellow solid.

Synthesis of 4'-(4-ethynylphenyl)-4-propylbicyclohexyl

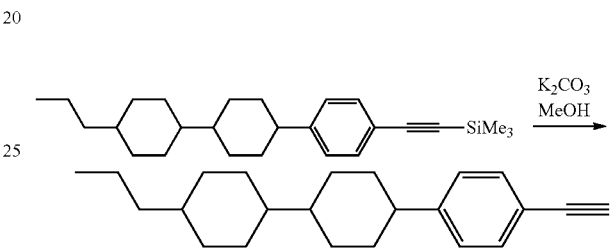

20.0 g (52.5 mmol) of trimethyl-[4-(4'-propylbicyclohexyl-4-yl)phenylethynyl]silane are stirred for 48 h together with 8.71 g (63.0 mmol) of K₂CO₃ and 1.5 ml of water in 250 ml of methanol. The mixture is diluted with MTBE and neutralised using dil. hydrochloric acid. The aqueous phase is extracted with MTBE, and the combined organic phases are washed with water and sat. sodium chloride solution. The solution is dried using sodium sulfate and concentrated to completion. The crude product is recrystallised from n-heptane. 4'-(4-Ethynylphenyl)-4-propylbicyclohexyl is obtained as a colourless solid having an m.p. of 71° C.

¹H-NMR (300 MHz, CHCl₃): δ=7.40 (d, 2H, J=8.4 Hz, $H_{arom.}$), 7.15 (d, 2H, J=8.4 Hz, $H_{arom.}$), 3.00 (s, 1H, $H_{alkynyl}$), 2.49-2.38 (m, 1H, $H_{benzyl}$), 1.94-1.70 (m, 8H, $H_{aliph.}$), 1.48-1.25 (m, 4H, $H_{aliph.}$), 1.20-0.94 (m, 9H, $H_{aliph.}$), 0.95-0.80 (m, 5H, $H_{aliph.}$).

MS (EI): m/e (%)=309 (100, M⁺).

Δ∈=+2.9

Δn=0.1824

$\gamma_1$=857 mPa·s

C 71 N 235 I

EXAMPLE 3

4-Propyl-4'-(4-prop-1-ynylphenyl)bicyclohexyl

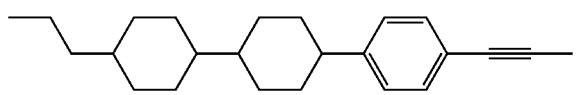

The compound 4-propyl-4'-(4-prop-1-ynylphenyl)bicyclohexyl according to the invention is prepared as described below:

Synthesis of 4-propyl-4'-(4-prop-1-ynylphenyl)bicyclohexyl

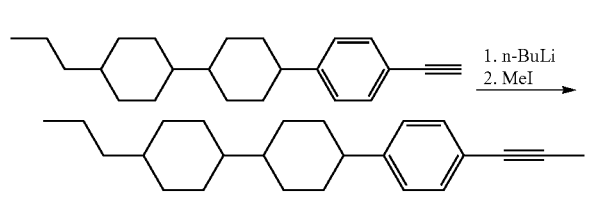

3.0 g (9.7 mmol) of 4'-(4-ethynylphenyl)-4-propylbicyclohexyl are initially introduced in 25 ml of THF at −20° C., and 7.3 ml (11.7 mmol) of n-BuLi (15% soln. in hexane) are added dropwise. After 1 h at this temperature, 0.73 ml (11.7 mmol) of methyl iodide is metered in, and the batch is left in the cooling bath to thaw for 3 h. Water and dil. hydrochloric acid are added, and the mixture is extracted a number of times with MTBE. The combined organic phases are washed with water and sat. sodium chloride soln., and the solution is dried using sodium sulfate. The crude product obtained after removal of the solvents is purified by column chromatography ($SiO_2$, n-heptane). The further purification is carried out by recrystallisation from n-heptane. This gives 4-propyl-4'-(4-prop-1-ynylphenyl)bicyclohexyl as a colourless solid having an m.p. of 82° C.

$^1$H-NMR (400 MHz, $CHCl_3$): δ=7.29 (d, 2H, J=8.0 Hz, $H_{arom.}$), 7.10 (d, 2H, J=8.0 Hz, $H_{arom.}$), 2.45-2.37 (m, 1H, $H_{benzyl}$), 2.03 (s, 3H, ≡—$CH_3$), 1.92-1.80 (m, 4H, $H_{aliph.}$), 1.79-1.68 (m, 4H, $H_{aliph.}$), 1.45-1.25 (m, 4H, $H_{aliph.}$), 1.20-0.94 (m, 9H, $H_{aliph.}$), 0.95-0.80 (m, 5H, $H_{aliph.}$).

MS (EI): m/e (%)=322 (100, M$^+$).

Δε=+3.2

Δn=0.1875

$γ_1$=1720 mPa·s

C 85 N 255 I

The compound according to the invention from Example (3) exhibits a significantly higher clearing point, a broader nematic phase, higher birefringence and higher dielectric anisotropy than the structurally analogous compounds from Comparative Examples 1 and 2.

COMPARATIVE EXAMPLE 1

4'-(4-Propylphenyl)-4-prop-1-ynylbicyclohexyl

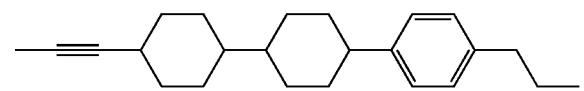

The comparative compound 4'-(4-pent-1-ynylphenyl)-4-propylbicyclohexyl is prepared as described below:

Synthesis of 4-(1,4-dioxaspiro[4.5]dec-8-yl)-1-(4-propylphenyl)cyclohexanol

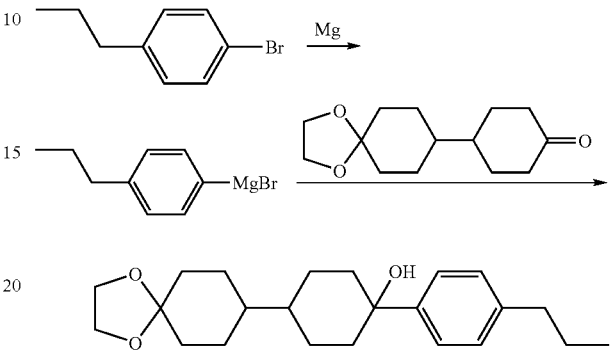

A solution of 160 g (0.67 mol) of 4-(1,4-dioxaspiro[4.5]dec-8-yl)cyclohexanone in 600 ml of THF is added to a solution of the Grignard reagent generated from 147 g (0.74 mol) of p-bromopropylbenzene and 18.0 g (0.74 mol) of magnesium turnings (400 ml of THF). When the addition is complete, the mixture is heated under reflux for 1 h, and sat. ammonium chloride soln. is added. The mixture is acidified using dil. hydrochloric acid and extracted a number of times with MTBE. The combined organic phases are washed with water, and the solution is dried using sodium sulfate. The crude product obtained after removal of the solvents is used without further purification.

Synthesis of 8-[4-(4-propylphenyl)cyclohex-3-enyl]-1,4-dioxaspiro[4.5]-decane

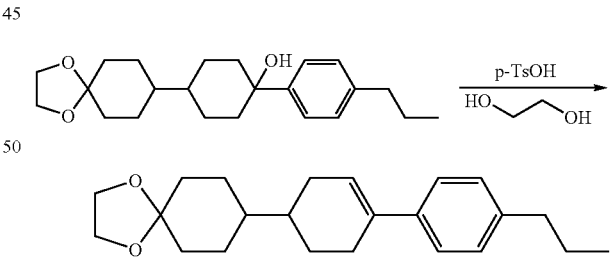

250 g (about 0.7 mol) of crude 4-(1,4-dioxaspiro[4.5]dec-8-yl)-1-(4-propylphenyl)cyclohexanol are heated on a water separator together with 13.2 g (69 mmol) of p-toluenesulfonic acid monohydrate and 40.7 ml (0.73 mol) of ethylene glycol in 800 ml of toluene. The solution is washed a number of times with water and dried using sodium sulfate. The crude product remaining after removal of the solvent is purified by chromatography ($SiO_2$, n-heptane:MTBE=5:1). 8-[4-(4-Propylphenyl)cyclohex-3-enyl]-1,4-dioxaspiro[4.5]decane is obtained as a colourless solid.

Synthesis of 8-[4-(4-propylphenyl)cyclohexyl]-1,4-dioxaspiro[4.5]decane

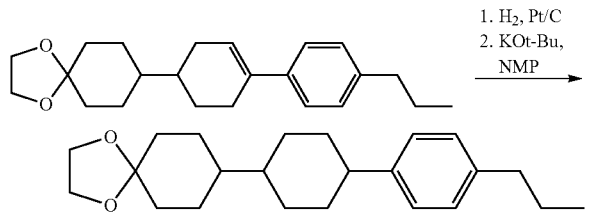

198 g (0.57 mol) of 8-[4-(4-propylphenyl)cyclohex-3-enyl]-1,4-dioxaspiro[4.5]decane are hydrogenated in n-heptane in the presence of Pt/C (5% of Pt). The reaction solution is concentrated to completion, and the residue is purified by column chromatography ($SiO_2$, n-heptane:MTBE=5:1).

The product obtained above is taken up in NMP, and 32 g (0.29 mol) of potassium tert-butoxide are added. The mixture is warmed at 60° C. for 18 h. After cooling, the batch is added to ice and acidified using hydrochloric acid. The mixture is extracted a number of times with MTBE, and the combined organic phases are washed with water. The solution is dried using sodium sulfate and concentrated to completion. The crude product is purified by column chromatography ($SiO_2$, n-heptane:MTBE=5:1). 8-[4-(4-Propylphenyl)cyclohexyl]-1,4-dioxaspiro[4.5]decane is obtained as a brownish solid.

Synthesis of 4'-(4-propylphenyl)bicyclohexyl-4-one

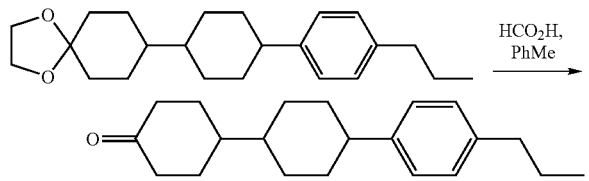

190.5 g (0.55 mol) of 8-[4-(4-propylphenyl)cyclohexyl]-1,4-dioxaspiro[4.5]-decane are stirred vigorously for 19 h together with 480 ml of formic acid in 900 ml of toluene. Water is added, and the organic phase is separated off. The aqueous phase is extracted with MTBE, and the combined organic phases are washed successively with water, sat. sodium hydrogencarbonate solution and sat. sodium chloride solution. The solution is dried using sodium sulfate and concentrated to completion. The crude product is recrystallised from n-heptane.

Synthesis of 4-methoxymethylene-4'-(4-propylphenyl)bicyclohexyl

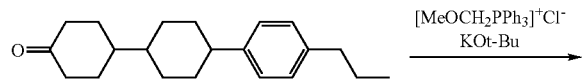

A solution of 55.0 g (0.50 mol) of potassium tert-butoxide in 250 ml of THF is added to a suspension of 170.0 g (0.50 mol) of methoxymethyltriphenylphosphonium chloride in 550 ml of THF at 0° C. After 30 min at this temperature, a solution of 4'-(4-propylphenyl)bicyclohexyl-4-one in 450 ml of THF is added, and the mixture is stirred at room temperature for 17 h. Water is added to the batch, which is then acidified using hydrochloric acid. The mixture is extracted a number of times with MTBE, and the combined organic phases are washed with water and saturated sodium chloride solution. The solution is concentrated to completion, and the residue is purified by column chromatography ($SiO_2$, n-heptane:MTBE=8:1).

Synthesis of 4'-(4-propylphenyl)bicyclohexyl-4-carbaldehyde

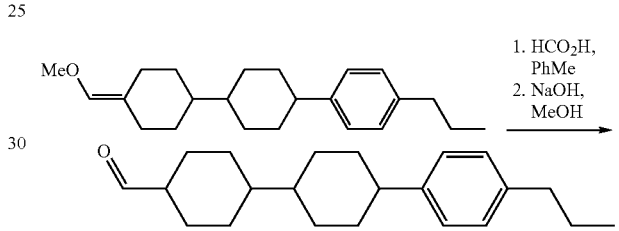

152.5 g (0.45 mol) of 4-methoxymethylene-4'-(4-propylphenyl)bicyclohexyl are stirred vigorously for 80 h together with 275 ml of formic acid in 685 ml of toluene. Water is added, and the organic phase is separated off. The aqueous phase is extracted with MTBE, and the combined organic phases are washed successively with water, sat. sodium hydrogencarbonate solution and sat. sodium chloride solution. The solution is dried using sodium sulfate and concentrated to completion.

The product obtained in this way is taken up in 1000 ml of methanol and 25 ml of THF, and 17.5 ml (0.11 mol) of 20% sodium hydroxide solution are added to the solution. After 2 h, the solution is cooled to 0° C., and the precipitated solid is filtered off with suction. The filter residue is washed with methanol, and the crude product is recrystallised from isopropanol. 4'-(4-Propylphenyl)bicyclohexyl-4-carbaldehyde is obtained as a colourless solid.

Synthesis of 4-(2,2-dibromovinyl)-4'-(4-propylphenyl)bicyclohexyl

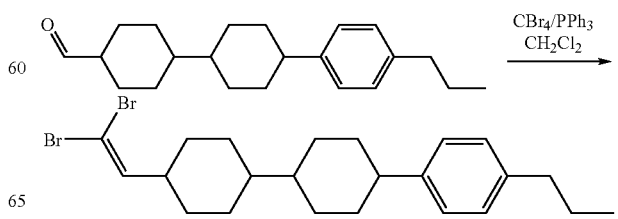

34.0 g (0.10 mol) of carbon tetrabromide are initially introduced in 120 ml of dichloromethane, and 53.7 g (0.21 mol) of triphenylphosphine are added in portions. When the addition is complete, the mixture is stirred for 30 min, and a suspension of 16.0 g (51.2 mmol) of 4'-(4-propylphenyl)bicyclohexyl-4-carbaldehyde in 45 ml of dichloromethane is slowly added. The mixture is stirred for 22 h, and the precipitate is filtered off. The filtrate is concentrated to completion, and the residue is purified by column chromatography (SiO$_2$, n-heptane). 4-(2,2-Dibromovinyl)-4'-(4-propylphenyl)bicyclohexyl is obtained as a colourless solid.

Synthesis of 4-ethynyl-4'-(4-propylphenyl)bicyclohexyl

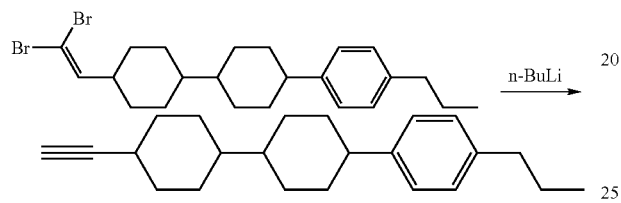

23.7 ml (38.0 mmol) of n-BuLi are added to 7.70 g (16.4 mmol) of 4-(2,2-dibromovinyl)-4'-(4-propylphenyl)bicyclohexyl in 40 ml of THF at −75° C. When the addition is complete, the mixture is stirred at this temperature for 2 h and subsequently warmed to −20° C. Water and dil. hydrochloric acid are added, and the batch is extracted a number of times with MTBE. The combined organic phases are washed with water and sat. sodium chloride solution and dried using sodium sulfate. The solution is concentrated to completion, and the residue is purified by column chromatography (SiO$_2$, n-heptane:1-chlorobutane=95:5). 4-Ethynyl-4'-(4-propylphenyl)bicyclohexyl is obtained as a colourless solid.

Synthesis of 4'-(4-propylphenyl)-4-prop-1-ynylbicyclohexyl

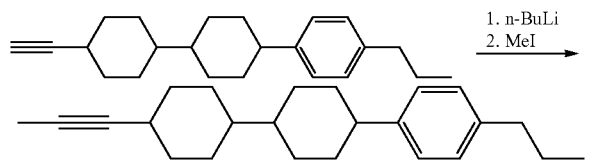

3.5 g (11.3 mmol) of 4-ethynyl-4'-(4-propylphenyl)bicyclohexyl are initially introduced in 30 ml of THF at −20° C., and 8.6 ml (13.6 mmol) of n-BuLi (15% soln. in hexane) are added dropwise. After 1 h at this temperature, 0.85 ml (13.6 mmol) of methyl iodide is metered in, and the batch is left in the cooling bath to thaw for 3 h. Water and dil. hydrochloric acid are added, and the mixture is extracted a number of times with MTBE. The combined organic phases are washed with water and sat. sodium chloride soln., and the solution is dried using sodium sulfate. The crude product obtained after removal of the solvents is purified by column chromatography (SiO$_2$, n-heptane:1-chlorobutane=4:1). The further purification is carried out by recrystallisation from n-heptane. This gives 4'-(4-propylphenyl)-4-prop-1-ynylbicyclohexyl as a colourless solid having an m.p. of 70° C.

$^1$H-NMR (300 MHz, CHCl$_3$): δ=7.13-7.06 (m, 4H, H$_{arom.}$), 2.54 (t, 2H, J=8.0 Hz, CH$_2$(benzyl)), 2.45-2.35 (m, 1H, H$_{benzyl}$), 1.85-1.70 (m, 7H, ═CH$_3$ and H$_{aliph.}$), 1.69-1.52 (m, 4H, H$_{aliph.}$), 1.48-1.23 (m, 4H, H$_{aliph.}$), 1.19-0.90 (m, 12H, H$_{aliph.}$).

MS (EI): m/e (%)=322 (100, M$^+$).

Δ∈=+1.8

Δn=0.139

γ$_1$=1006 Pa·s

C 70 SmB 103 N 191 I

The compound has worse properties than Example Compound 3. The clearing point is lower and the rotational viscosity to clearing point ratio is worse. In particular, the compound of the comparative example is smectic over a broad temperature range.

COMPARATIVE EXAMPLE 2

1-(4-Ethynylcyclohexyl)-4-(4-propylcyclohexyl)benzene

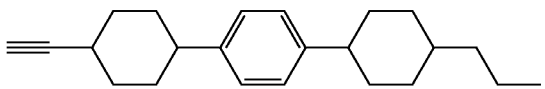

The synthesis of 1-(4-ethynylcyclohexyl)-4-(4-propylcyclohexyl)benzene is carried out analogously to Comparative Example 1 starting from 1-bromo-4-(4-propylcyclohexyl)benzene and 1,4-dioxaspiro[4.5]decan-8-one. The corresponding starting materials and intermediates as described above are used.

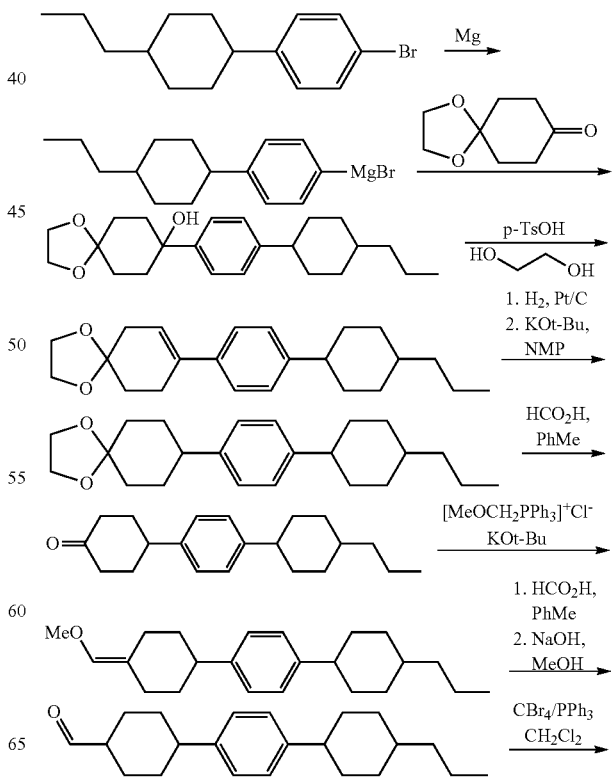

-continued

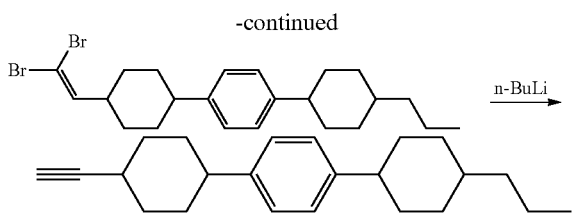

1-(4-Ethynylcyclohexyl)-4-(4-propylcyclohexyl)benzene is obtained as a colourless solid having an m.p. of 143° C.

$^1$H-NMR (300 MHz, CHCl$_3$): δ=7.14-7.08 (m, 4H, H$_{arom.}$), 2.52-2.36 (m, 2H, H$_{benzyl}$), 2.34-2.36 (m, 1H, H$_{propargyl}$), 2.15-2.05 (m, 3H, H$_{alkynyl}$+H$_{aliph.}$), 1.95-1.80 (m, 6H, H$_{aliph.}$), 1.61-1.16 (m, 11H, H$_{aliph.}$), 1.11-0.96 (m, 2H, H$_{aliph.}$), 0.90 (t, 3H, J=7.2 Hz, CH$_3$).

MS (EI): m/e (%)=308 (63, M$^+$), 280 (100, M$^+$).

Δ∈=+1.7
Δn=0.1209
γ$_1$=480 Pa·s
C 143 N 168 I

The compound has a lower clearing point than Example Compound 3 and a significantly narrower nematic phase. The high melting point indicates worse solubility in nematic media.

COMPARATIVE EXAMPLE 3

1-(4-Propylcyclohexyl)-4-(4-prop-1-ynylcyclohexyl)benzene

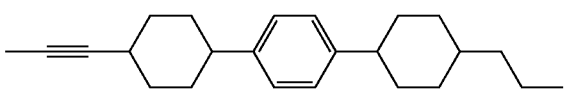

The synthesis of 1-(4-propylcyclohexyl)-4-(4-prop-1-ynylcyclohexyl)benzene is carried out analogously to Comparative Example 1 starting from 1-bromo-4-(4-propylcyclohexyl)benzene.

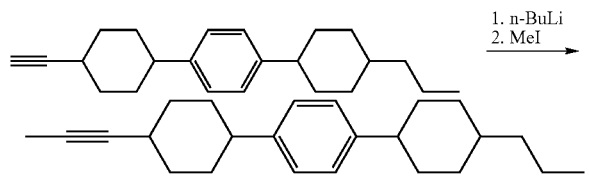

1-(4-Propylcyclohexyl)-4-(4-prop-1-ynylcyclohexyl)benzene is obtained as a colourless solid having an m.p. of 134° C.

$^1$H-NMR (400 MHz, CHCl$_3$): δ=7.14-7.07 (m, 4H, H$_{arom.}$), 2.50-2.36 (m, 2H, H$_{benzyl}$), 2.27-2.15 (m, 1H, H$_{propargyl}$), 2.09-2.01 (m, 2H, H$_{aliph.}$), 1.92-1.78 (m, 6H, H$_{aliph.}$), 1.53-1.16 (m, 14H, H$_{aliph.}$), 1.09-0.96 (m, 2H, H$_{aliph.}$), 0.90 (t, 3H, J=7.2 Hz, CH$_3$).

MS (EI): m/e (%)=322 (48, M$^+$), 294 (100, M$^+$).

Δ∈=+1.1
Δn=0.1337
γ$_1$=1003 Pa·s
C 134 N 193 I

The compound has a significantly lower clearing point and approximately the same rotational viscosity as Example Compound 3. Furthermore, the nematic phase range is very much smaller. The high melting point indicates worse solubility in nematic media.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding DE application No. 102009005191.0, filed Jan. 20, 2009, and U.S. are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A compound of formula I

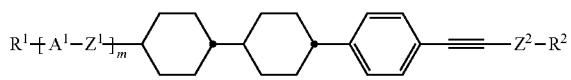

in which
R$^1$ denotes H, F, Cl, Br, —CN, —SCN, —NCS, SF$_5$ or straight-chain or branched alkyl having 1 to 12 C atoms, in which, in addition, one or more non-adjacent CH$_2$ groups may each be replaced, independently of one another, by —C≡C—, —CO—, —CO—O—, —O—CO—, —O—CO—O— in such a way that O and/or S atoms are not linked directly to one another, and in which, in addition, one or more H atoms may be replaced by F, Cl or Br, or P-Sp-, R$^2$ denotes H or an unsubstituted alkyl having 1 to 5 C atoms, P denotes a polymerizable group, Sp denotes a spacer group or a single bond, A$^1$ on each occurrence, identically or differently, denotes phenylene-1,4-diyl, in which, in addition, one or two CH groups may be replaced by N and one or more H atoms may be replaced by halogen, CN, CH$_3$, CHF$_2$, CH$_2$F, OCH$_3$, OCHF$_2$ or OCF$_3$, cyclohexane-1,4-diyl, in which, in addition, one or two non-adjacent CH$_2$ groups may be replaced, independently of one another, by O and/or S, and one or more H atoms may be replaced by F, cyclohexene-1,4-diyl, bicyclo[1.1.1]pentane-1,3-diyl, bicyclo[2.2.2]octane-1,4-diyl, spiro[3.3]heptane-2,6-diyl, tetrahydropyran-2,5-diyl or 1,3-dioxane-2,5-diyl, Z$^1$ and Z$^2$ each, independently of one another, denote —CF$_2$O—, —OCF$_2$—, —CH$_2$O—, —OCH$_2$—, —C$_2$H$_4$—, —C$_2$F$_4$—, —CF$_2$CH$_2$—, —CH$_2$CF$_2$—, —CFHCFH—, —CFHCH$_2$—, —CH$_2$CFH—, —CF$_2$CFH—, —CFHCF$_2$—, —CH=CH—, —CF=CH—, —CH=CF—, —CF=CF—, —C≡C— or a single bond, and m denotes 0, 1, 2 or 3.

2. A compound according to claim 1, wherein m denotes 0 or 1.

3. A compound according to claim 1, wherein $A^1$ is

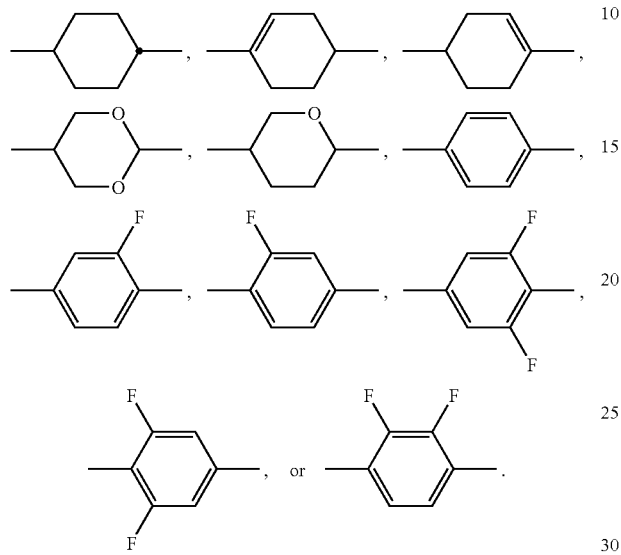

4. A compound according to claim 1, wherein $Z^1$ and $Z^2$ denote a single bond.

5. A compound according to claim 1, wherein $R^1$ denotes alkyl having 1 to 5 C atoms, and $R^2$ denotes an unsubstituted alkyl having 1 to 5 C atoms.

6. A compound according to claim 1, which is a compound of formula Ia

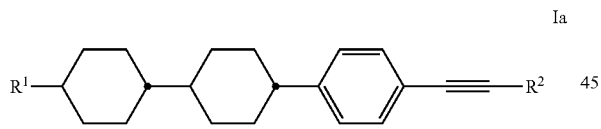

Ia in which $R^1$ denotes H, F, Cl, Br, —CN, —SCN, —NCS, $SF_5$ or straight-chain or branched alkyl having 1 to 12 C atoms, in which, in addition, one or more non-adjacent $CH_2$ groups may each be replaced, independently of one another, by —C≡C—, —CO—, —CO—O—, —O—CO—, —O—CO—O— in such a way that O and/or S atoms are not linked directly to one another, and in which, in addition, one or more H atoms may be replaced by F, Cl or Br, or P-Sp-, and $R^2$ denotes H or an unsubstituted alkyl having 1 to 5 C atoms.

7. A liquid crystal medium comprising one or more compounds according to claim 1, and at least one further liquid crystalline compound that is not of formula I.

8. A liquid crystal medium according to claim 7, comprising one or more compounds of formulae II and/or III:

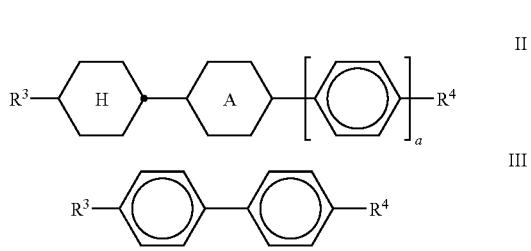

in which
A denotes 1,4-phenylene or trans-1,4-cyclohexylene,
a is 0 or 1,
$R^3$ denotes alkenyl having 2 to 9 C atoms, and
$R^4$ denotes alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another.

9. A liquid crystal medium according to claim 7, comprising one or more compounds of the following formulae:

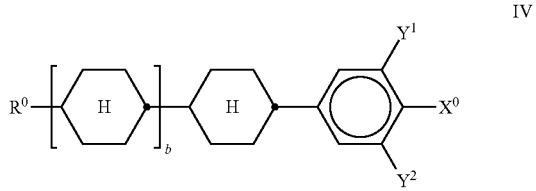

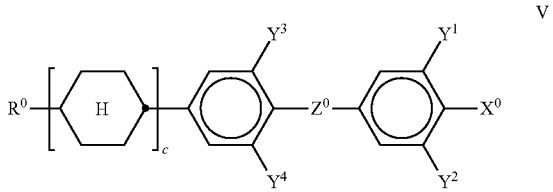

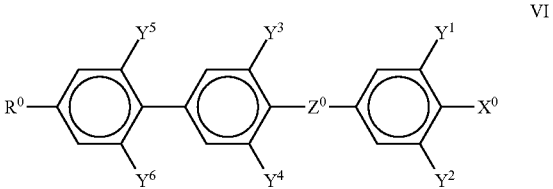

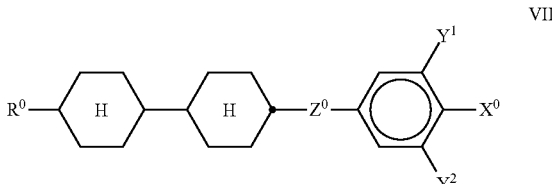

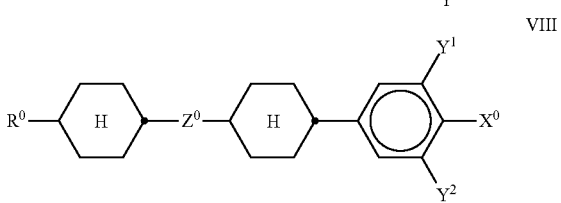

in which
$R^0$ denotes an alkyl or alkoxy radical having 1 to 15 C atoms, in which, in addition, one or more $CH_2$ groups may each be replaced, independently of one another, by —C≡C—, —$CF_2$O—, —CH=CH—,

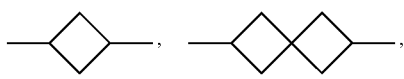

—O—, —CO—O— or —O—CO— in such a way that O atoms are not linked directly to one another, and in which, in addition, one or more H atoms may be replaced by halogen, $X^0$ denotes F, Cl, CN, $SF_5$, SCN, NCS, a halogenated alkyl radical, halogenated alkenyl radical, halogenated alkoxy radical or halogenated alkenyloxy radical, each having up to 6 C atoms, $Y^{1-6}$ each, independently of one another, denote H or F, $Z^0$ denotes —$C_2H_4$—, —$(CH_2)_4$—, —CH=CH—, —CF=CF—, —$C_2F_4$—, —$CH_2CF_2$—, —$CF_2CH_2$—, —$CH_2O$—, —$OCH_2$—, —COO—, —$CF_2O$— or —$OCF_2$—, and in the formulae V and VI also a single bond, and b and c each, independently of one another, denote 0 or 1.

10. A liquid crystal display containing one or more compounds according to claim 1.

11. A liquid crystal display according to claim 10, which is an MLC, TN, STN or IPS display.

12. A process for preparing a compound according to claim 1, comprising
a) metallating 1,4-dihalobenzene in one halogen position,
b) adding the organometallic compound obtained in a) onto a ketone of the following formula:

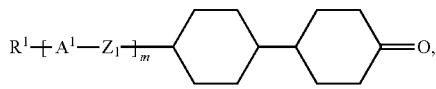

wherein $R^1$, $A^1$, $Z^1$ and m have the meanings indicated for the compound of formula I,
c) eliminating water from the alcohol obtained in b),
d) hydrogenating the alkene obtained in c),
e) optionally isomerizing the mixture obtained in d) to give the trans-trans isomer of the bicyclohexyl group of the following formula:

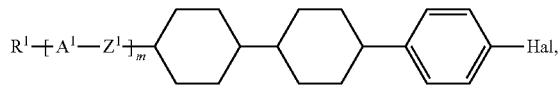

wherein $R^1$, $A^1$, $Z^1$ and m have the meanings indicated for the compound of formula I, and Hal is halogen,
f1) Sonogashira coupling the halogen compound obtained in e) to an alkyne of formula HC≡C—$Z^2$—$R^2$, in which $R^2$ and $Z^2$ have the meanings indicated for the compound of formula I,
or f2) Sonogashira coupling the halogen compound obtained in e) to trialkylsilylacetylene,
g2) desilylating the acetylene obtained in f2),
h2) deprotonating the terminal acetylene obtained in g2) by a base,
i2) alkylating the acetylide obtained in h2) by an alkylating agent, optionally by an alkyl iodide of formula $R^2$—I, or
i3) reacting the acetylide obtained in h2) with a haloalkane in a Kumada-Corriu reaction.

13. A compound according to claim 1, wherein $R^2$ denotes methyl.

14. A compound according to claim 6, wherein $R^2$ denotes methyl.

15. A compound according to claim 1, which is a compound of formula Ia, Ib or Ic

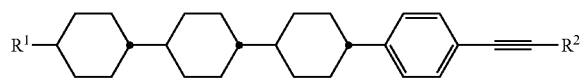

in which
$R^1$ denotes H, F, Cl, Br, —CN, —SCN, —NCS, $SF_5$ or straight-chain or branched alkyl having 1 to 12 C atoms, in which, in addition, one or more non-adjacent $CH_2$ groups may each be replaced, independently of one another, by —CH=CH—, —C≡C—, —CO—, —CO—O—, —O—CO—, —O—CO—O— in such a way that O and/or S atoms are not linked directly to one another, and in which, in addition, one or more H atoms may be replaced by F, Cl or Br, or P-Sp-, and
$R^2$ denotes H or an unsubstituted alkyl having 1 to 5 C atoms.

16. A compound according to claim 15, wherein $R^2$ denotes methyl.

17. A compound according to claim 1, wherein $R^1$ denotes alkyl.

18. A compound according to claim 1, wherein $R^1$ denotes F, Cl, Br, —CN, —SCN, —NCS, or $SF_5$.

19. A compound according to claim 1, wherein $R^2$ denotes straight-chain methyl, ethyl, propyl, butyl or pentyl.

20. A compound according to claim 17, wherein $R^2$ denotes straight-chain methyl, ethyl, propyl, butyl or pentyl.

21. A compound according to claim 1, wherein
$Z^2$ denotes —$CF_2O$—, —$OCF_2$—, —$CH_2O$—, —$OCH_2$—, —$C_2F_4$—, —$CF_2CH_2$—, —$CH_2CF_2$—, —CFHCFH—, —CFHCH2—, —$CH_2$CFH—, —$CF_2$CFH—, —CFHCF2—, —CH=CH—, —CF=CH—, —CH=CF—, —CF=CF—, —C≡C— or a single bond.

* * * * *